United States Patent
Dinca

(10) Patent No.: US 12,385,854 B2
(45) Date of Patent: Aug. 12, 2025

(54) METHODS AND SYSTEMS FOR PERFORMING ON-THE-FLY AUTOMATIC CALIBRATION ADJUSTMENTS OF X-RAY INSPECTION SYSTEMS

(71) Applicant: Rapiscan Holdings, Inc., Hawthorne, CA (US)

(72) Inventor: Dan-Cristian Dinca, Chelmsford, MA (US)

(73) Assignee: Rapiscan Holdings, Inc., Hawthorne, CA (US)

( * ) Notice: Subject to any disclaimer, the term of this patent is extended or adjusted under 35 U.S.C. 154(b) by 199 days.

(21) Appl. No.: 18/149,401

(22) Filed: Jan. 3, 2023

(65) Prior Publication Data
US 2023/0147681 A1 May 11, 2023

Related U.S. Application Data

(60) Provisional application No. 63/369,386, filed on Jul. 26, 2022.

(51) Int. Cl.
*G01N 23/04* (2018.01)
*G01V 5/22* (2024.01)

(52) U.S. Cl.
CPC ............. *G01N 23/04* (2013.01); *G01V 5/224* (2024.01)

(58) Field of Classification Search
None
See application file for complete search history.

(56) References Cited

U.S. PATENT DOCUMENTS

| 2,831,123 A | 4/1958 | Daly |
| 2,971,433 A | 2/1961 | Akin |
| 2,972,430 A | 2/1961 | Johnson |
| 3,374,355 A | 3/1968 | Parratt |
| 3,417,243 A | 12/1968 | Hill |
| 3,676,783 A | 7/1972 | Kinbara |

(Continued)

FOREIGN PATENT DOCUMENTS

| CA | 1301371 C | 5/1992 |
| CA | 2163884 | 12/1994 |

(Continued)

OTHER PUBLICATIONS

International Search Report for PCT/US23/60026, Jul. 3, 2023.
(Continued)

*Primary Examiner* — Edwin C Gunberg
(74) *Attorney, Agent, or Firm* — Novel IP

(57) ABSTRACT

The specification discloses methods of adjusting calibration data in an X-ray inspection system. Calibration data is initially generated. X-ray scan images of a cargo container are then acquired. Each of the X-ray scan images are segmented into regions of interest, where the regions of interest volumetrically encompass a known material or a material corresponding to a known HS code. Using the calibration data, first data indicative of Zeff of each of the regions of interest are determined. The first data is compared with second data indicative of known Zeff corresponding to the known materials and/or HS codes. The calibration data is then adjusted to generate a second calibration data if the first and second data differ significantly. The calibration data is replaced by the second calibration data in the memory.

20 Claims, 5 Drawing Sheets

(56) References Cited

U.S. PATENT DOCUMENTS

| | | |
|---|---|---|
| 3,766,387 A | 10/1973 | Heffan |
| 3,767,850 A | 10/1973 | Mc Millian |
| 3,770,955 A | 11/1973 | Tomita |
| 3,784,837 A | 1/1974 | Holmstrom |
| 3,904,923 A | 9/1975 | Schwartz |
| 3,961,186 A | 6/1976 | Leunbach |
| 3,988,586 A | 10/1976 | Stuart |
| 4,020,346 A | 4/1977 | Dennis |
| 4,031,401 A | 6/1977 | Jacob |
| 4,047,035 A | 9/1977 | Dennhoven |
| 4,064,440 A | 12/1977 | Roder |
| 4,139,771 A | 2/1979 | Dennhoven |
| 4,210,811 A | 7/1980 | Dennhoven |
| 4,216,499 A | 8/1980 | Manfred |
| 4,242,583 A | 12/1980 | Annis |
| 4,254,599 A | 3/1981 | Maistre |
| 4,260,898 A | 4/1981 | Annis |
| 4,315,146 A | 2/1982 | Rudin |
| 4,342,914 A | 8/1982 | Bjorkholm |
| 4,366,382 A | 12/1982 | Kotowski |
| 4,380,817 A | 4/1983 | Harding |
| 4,420,182 A | 12/1983 | Kaneshiro |
| 4,430,568 A | 2/1984 | Yoshida |
| 4,472,822 A | 9/1984 | Swift |
| 4,503,332 A | 3/1985 | Annis |
| 4,525,854 A | 6/1985 | Molbert |
| 4,563,707 A | 1/1986 | Kishida |
| 4,566,113 A | 1/1986 | Gerhard |
| 4,599,740 A | 7/1986 | Cable |
| 4,626,688 A | 12/1986 | Barnes |
| 4,641,330 A | 2/1987 | Herwig |
| 4,646,339 A | 2/1987 | Rice |
| 4,709,382 A | 11/1987 | Sones |
| 4,719,153 A | 1/1988 | Akasawa |
| 4,736,401 A | 4/1988 | Donges |
| 4,788,704 A | 11/1988 | Donges |
| 4,799,247 A | 1/1989 | Annis |
| 4,809,312 A | 2/1989 | Annis |
| 4,817,123 A | 3/1989 | Sones |
| 4,825,454 A | 4/1989 | Annis |
| 4,853,595 A | 8/1989 | Alfano |
| 4,864,142 A | 9/1989 | Gomberg |
| 4,870,670 A | 9/1989 | Geus |
| 4,872,188 A | 10/1989 | Lauro |
| 4,884,289 A | 11/1989 | Glockmann |
| 4,906,973 A | 3/1990 | Karbowski |
| 4,975,917 A | 12/1990 | Villa |
| 4,979,202 A | 12/1990 | Siczek |
| 4,991,189 A | 2/1991 | Boomgaarden |
| 5,006,299 A | 4/1991 | Gozani |
| 5,014,293 A | 5/1991 | Boyd |
| 5,022,062 A | 6/1991 | Annis |
| 5,046,846 A | 9/1991 | Ray |
| 5,065,418 A | 11/1991 | Bermbach |
| 5,076,993 A | 12/1991 | Sawa |
| 5,091,924 A | 2/1992 | Bermbach |
| 5,098,640 A | 3/1992 | Gozani |
| 5,103,099 A | 4/1992 | Bourdinaud |
| 5,114,662 A | 5/1992 | Gozani |
| 5,179,581 A | 1/1993 | Annis |
| 5,181,234 A | 1/1993 | Smith |
| 5,182,764 A | 1/1993 | Peschmann |
| 5,185,778 A | 2/1993 | Magram |
| 5,202,932 A | 4/1993 | Cambier |
| 5,218,202 A | 6/1993 | Evers |
| 5,221,843 A | 6/1993 | Alvarez |
| 5,224,144 A | 6/1993 | Annis |
| 5,237,598 A | 8/1993 | Albert |
| 5,247,561 A | 9/1993 | Kotowski |
| 5,253,283 A | 10/1993 | Annis |
| 5,313,511 A | 5/1994 | Annis |
| 5,319,547 A | 6/1994 | Krug |
| 5,361,840 A | 11/1994 | Matthews |
| 5,367,552 A | 11/1994 | Peschmann |
| 5,379,334 A | 1/1995 | Zimmer |
| 5,391,878 A | 2/1995 | Petroff |
| 5,394,454 A | 2/1995 | Harding |
| 5,428,657 A | 6/1995 | Papanicolopoulos |
| 5,430,787 A | 7/1995 | Norton |
| 5,493,596 A | 2/1996 | Annis |
| 5,524,133 A | 6/1996 | Neale |
| 5,548,123 A | 8/1996 | Perez-Mendez |
| 5,548,630 A | 8/1996 | Hell |
| 5,600,303 A | 2/1997 | Husseiny |
| 5,600,700 A | 2/1997 | Krug |
| 5,602,894 A | 2/1997 | Bardash |
| 5,606,167 A | 2/1997 | Miller |
| 5,608,214 A | 3/1997 | Baron |
| 5,638,420 A | 6/1997 | Armistead |
| 5,642,393 A | 6/1997 | Krug |
| 5,642,394 A | 6/1997 | Rothschild |
| 5,666,393 A | 9/1997 | Annis |
| 5,687,210 A | 11/1997 | Maitrejean |
| 5,692,028 A | 11/1997 | Geus |
| 5,692,029 A | 11/1997 | Husseiny |
| 5,696,806 A | 12/1997 | Grodzins |
| 5,751,837 A | 5/1998 | Watanabe |
| 5,763,886 A | 6/1998 | Schulte |
| 5,763,903 A | 6/1998 | Mandai |
| 5,764,683 A | 6/1998 | Swift |
| 5,768,334 A | 6/1998 | Maitrejean |
| 5,783,829 A | 7/1998 | Sealock |
| 5,787,145 A | 7/1998 | Geus |
| 5,790,685 A | 8/1998 | Sallee |
| 5,805,660 A | 9/1998 | Perion |
| 5,838,758 A | 11/1998 | Krug |
| 5,838,759 A | 11/1998 | Armistead |
| 5,903,623 A | 5/1999 | Swift |
| 5,910,973 A | 6/1999 | Grodzins |
| 5,930,326 A | 7/1999 | Rothschild |
| 5,940,468 A | 8/1999 | Huang |
| 5,949,842 A | 9/1999 | Schafer |
| 5,974,111 A | 10/1999 | Krug |
| 6,018,562 A | 1/2000 | Willson |
| 6,031,890 A | 2/2000 | Bermbach |
| 6,058,158 A | 5/2000 | Eiler |
| 6,067,344 A | 5/2000 | Grodzins |
| 6,069,936 A | 5/2000 | Bjorkholm |
| 6,078,052 A | 6/2000 | Difilippo |
| 6,081,580 A | 6/2000 | Grodzins |
| 6,094,472 A | 7/2000 | Smith |
| 6,118,850 A | 9/2000 | Mayo |
| 6,125,165 A | 9/2000 | Warburton |
| 6,151,381 A | 11/2000 | Grodzins |
| 6,188,747 B1 | 2/2001 | Geus |
| 6,192,101 B1 | 2/2001 | Grodzins |
| 6,192,104 B1 | 2/2001 | Adams |
| 6,195,413 B1 | 2/2001 | Geus |
| 6,198,795 B1 | 3/2001 | Naumann |
| 6,212,251 B1 | 4/2001 | Tomura |
| 6,216,540 B1 | 4/2001 | Nelson |
| 6,218,943 B1 | 4/2001 | Ellenbogexn |
| 6,236,709 B1 | 5/2001 | Perry |
| 6,249,567 B1 | 6/2001 | Rothschild |
| 6,252,929 B1 | 6/2001 | Swift |
| 6,256,369 B1 | 7/2001 | Lai |
| 6,278,115 B1 | 8/2001 | Annis |
| 6,282,260 B1 | 8/2001 | Grodzins |
| 6,292,533 B1 | 9/2001 | Swift |
| 6,301,326 B2 | 10/2001 | Bjorkholm |
| 6,304,629 B1 | 10/2001 | Conway |
| 6,320,933 B1 | 11/2001 | Grodzins |
| 6,324,243 B1 | 11/2001 | Edic |
| 6,347,132 B1 | 2/2002 | Annis |
| 6,356,620 B1 | 3/2002 | Rothschild |
| 6,418,194 B1 | 7/2002 | McPherson |
| 6,421,420 B1 | 7/2002 | Grodzins |
| 6,424,695 B1 | 7/2002 | Grodzins |
| 6,434,219 B1 | 8/2002 | Rothschild |
| 6,435,715 B1 | 8/2002 | Betz |
| 6,442,233 B1 | 8/2002 | Grodzins |
| 6,445,765 B1 | 9/2002 | Frank |
| 6,448,564 B1 | 9/2002 | Johnson |
| 6,453,003 B1 | 9/2002 | Springer |

(56) References Cited

U.S. PATENT DOCUMENTS

| | | |
|---|---|---|
| 6,453,007 B2 | 9/2002 | Adams |
| 6,456,684 B1 | 9/2002 | Mun |
| 6,459,761 B1 | 10/2002 | Grodzins |
| 6,459,764 B1 | 10/2002 | Chalmers |
| 6,473,487 B1 | 10/2002 | Le |
| RE37,899 E | 11/2002 | Grodzins |
| 6,483,894 B2 | 11/2002 | Hartick |
| 6,507,025 B1 | 1/2003 | Verbinski |
| 6,532,276 B1 | 3/2003 | Hartick |
| 6,542,574 B2 | 4/2003 | Grodzins |
| 6,542,578 B2 | 4/2003 | Ries |
| 6,542,580 B1 | 4/2003 | Carver |
| 6,543,599 B2 | 4/2003 | Jasinetzky |
| 6,546,072 B1 | 4/2003 | Chalmers |
| 6,552,346 B2 | 4/2003 | Verbinski |
| 6,556,653 B2 | 4/2003 | Hussein |
| 6,563,903 B2 | 5/2003 | Kang |
| 6,567,496 B1 | 5/2003 | Sychev |
| 6,580,778 B2 | 6/2003 | Meder |
| 6,584,170 B2 | 6/2003 | Aust |
| 6,590,956 B2 | 7/2003 | Fenkart |
| 6,597,760 B2 | 7/2003 | Beneke |
| 6,605,473 B1 | 8/2003 | Hajduk |
| 6,606,516 B2 | 8/2003 | Levine |
| 6,636,581 B2 | 10/2003 | Sorenson |
| 6,637,266 B1 | 10/2003 | Froom |
| 6,653,588 B1 | 11/2003 | Gillard-Hickman |
| 6,658,087 B2 | 12/2003 | Chalmers |
| 6,663,280 B2 | 12/2003 | Doenges |
| 6,665,373 B1 | 12/2003 | Kotowski |
| 6,665,433 B2 | 12/2003 | Roder |
| 6,702,459 B2 | 3/2004 | Barnes |
| 6,727,506 B2 | 4/2004 | Mallette |
| 6,735,279 B1 | 5/2004 | Jacobs |
| 6,763,635 B1 | 7/2004 | Lowman |
| 6,777,684 B1 | 8/2004 | Volkov |
| 6,785,357 B2 | 8/2004 | Bernardi |
| 6,812,426 B1 | 11/2004 | Kotowski |
| 6,816,571 B2 | 11/2004 | Bijjani |
| 6,837,422 B1 | 1/2005 | Meder |
| 6,839,134 B2 | 1/2005 | Saito |
| 6,839,403 B1 | 1/2005 | Kotowski |
| 6,843,599 B2 | 1/2005 | Le |
| 6,856,344 B2 | 2/2005 | Frantz |
| 6,876,719 B2 | 4/2005 | Ozaki |
| 6,879,657 B2 | 4/2005 | Hoffman |
| 6,920,197 B2 | 7/2005 | Kang |
| 6,928,137 B2 | 8/2005 | Bruder |
| 6,928,141 B2 | 8/2005 | Carver |
| 6,965,314 B2 | 11/2005 | Bohinc, Jr. |
| 6,973,158 B2 | 12/2005 | Besson |
| 6,987,833 B2 | 1/2006 | Du |
| 7,010,094 B2 | 3/2006 | Grodzins |
| 7,039,159 B2 | 5/2006 | Muenchau |
| 7,045,788 B2 | 5/2006 | Iwatschenko-Borho |
| 7,062,011 B1 | 6/2006 | Tybinkowski |
| 7,099,434 B2 | 8/2006 | Adams |
| 7,103,137 B2 | 9/2006 | Seppi |
| 7,115,875 B1 | 10/2006 | Worstell |
| 7,116,235 B2 | 10/2006 | Alioto |
| 7,130,484 B2 | 10/2006 | August |
| RE39,396 E | 11/2006 | Swift |
| 7,151,447 B1 | 12/2006 | Willms |
| 7,158,611 B2 | 1/2007 | Heismann |
| 7,162,005 B2 | 1/2007 | Bjorkholm |
| 7,166,844 B1 | 1/2007 | Gormley |
| 7,177,391 B2 | 2/2007 | Chapin |
| 7,185,206 B2 | 2/2007 | Goldstein |
| 7,203,276 B2 | 4/2007 | Arsenault |
| 7,207,713 B2 | 4/2007 | Lowman |
| 7,215,737 B2 | 5/2007 | Li |
| 7,218,704 B1 | 5/2007 | Adams |
| 7,238,951 B2 | 7/2007 | Disdier |
| 7,244,947 B2 | 7/2007 | Polichar |
| 7,260,255 B2 | 8/2007 | Polichar |
| 7,261,466 B2 | 8/2007 | Bhatt |
| 7,277,526 B2 | 10/2007 | Rifkin |
| 7,286,638 B2 | 10/2007 | Ledoux |
| 7,308,076 B2 | 12/2007 | Studer |
| 7,319,737 B2 | 1/2008 | Singh |
| 7,322,745 B2 | 1/2008 | Agrawal |
| 7,333,587 B2 | 2/2008 | De Man |
| 7,349,525 B2 | 3/2008 | Morton |
| 7,352,843 B2 | 4/2008 | Hu |
| 7,354,197 B2 | 4/2008 | Bhatt |
| 7,366,282 B2 | 4/2008 | Peschmann |
| 7,368,717 B2 | 5/2008 | Verbinski |
| 7,369,463 B1 | 5/2008 | Van Dullemen |
| 7,369,642 B2 | 5/2008 | Eilbert |
| 7,372,040 B2 | 5/2008 | Polichar |
| 7,376,218 B2 | 5/2008 | Chapin |
| 7,379,530 B2 | 5/2008 | Hoff |
| 7,381,962 B2 | 6/2008 | Goldberg |
| 7,397,891 B2 | 7/2008 | Johnson |
| 7,400,701 B1 | 7/2008 | Cason |
| 7,406,192 B2 | 7/2008 | Schmiegel |
| 7,420,174 B2 | 9/2008 | Kurita |
| 7,440,543 B2 | 10/2008 | Morton |
| 7,440,544 B2 | 10/2008 | Scheinman |
| 7,453,987 B1 | 11/2008 | Richardson |
| 7,483,511 B2 | 1/2009 | Bendahan |
| 7,486,768 B2 | 2/2009 | Allman |
| 7,490,984 B2 | 2/2009 | Bhatt |
| 7,492,682 B2 | 2/2009 | Osakabe |
| 7,492,862 B2 | 2/2009 | Bendahan |
| 7,492,934 B2 | 2/2009 | Mundy |
| 7,505,556 B2 | 3/2009 | Chalmers |
| 7,505,557 B2 | 3/2009 | Modica |
| 7,505,562 B2 | 3/2009 | Dinca |
| 7,505,563 B2 | 3/2009 | Morton |
| 7,508,910 B2 | 3/2009 | Safai |
| 7,510,324 B2 | 3/2009 | Bhatt |
| 7,512,215 B2 | 3/2009 | Morton |
| 7,517,149 B2 | 4/2009 | Agrawal |
| 7,519,148 B2 | 4/2009 | Kotowski |
| 7,522,696 B2 | 4/2009 | Imai |
| 7,525,101 B2 | 4/2009 | Grodzins |
| 7,526,064 B2 | 4/2009 | Akery |
| 7,538,325 B2 | 5/2009 | Mishin |
| 7,547,888 B2 | 6/2009 | Cooke |
| 7,551,714 B2 | 6/2009 | Rothschild |
| 7,551,715 B2 | 6/2009 | Rothschild |
| 7,551,718 B2 | 6/2009 | Rothschild |
| 7,555,099 B2 | 6/2009 | Rothschild |
| 7,564,939 B2 | 7/2009 | Morton |
| 7,593,506 B2 | 9/2009 | Cason |
| 7,593,510 B2 | 9/2009 | Rothschild |
| 7,609,807 B2 | 10/2009 | Leue |
| 7,636,418 B2 | 12/2009 | Anwar |
| 7,649,976 B2 | 1/2010 | Georgeson |
| 7,653,545 B1 | 1/2010 | Starkie |
| 7,660,388 B2 | 2/2010 | Gray |
| 7,664,230 B2 | 2/2010 | Morton |
| 7,671,784 B2 | 3/2010 | Steinway |
| 7,684,538 B2 | 3/2010 | Morton |
| 7,693,261 B2 | 4/2010 | Robinson |
| 7,720,195 B2 | 5/2010 | Allman |
| 7,724,868 B2 | 5/2010 | Morton |
| 7,724,869 B2 | 5/2010 | Wang |
| 7,738,687 B2 | 6/2010 | Tortora |
| 7,741,612 B2 | 6/2010 | Clothier |
| 7,742,568 B2 | 6/2010 | Smith |
| 7,750,294 B2 | 7/2010 | Bright |
| 7,760,103 B2 | 7/2010 | Frank |
| 7,783,003 B2 | 8/2010 | Clayton |
| 7,783,004 B2 | 8/2010 | Kotowski |
| 7,800,073 B2 | 9/2010 | Clothier |
| 7,809,103 B2 | 10/2010 | Du |
| 7,809,104 B2 | 10/2010 | Foland |
| 7,809,109 B2 | 10/2010 | Mastronardi |
| 7,817,776 B2 | 10/2010 | Agrawal |
| 7,831,012 B2 | 11/2010 | Foland |
| 7,844,027 B2 | 11/2010 | Harding |
| 7,844,028 B2 | 11/2010 | Korsunsky |

(56) References Cited

U.S. PATENT DOCUMENTS

| | | |
|---|---|---|
| 7,860,213 B2 | 12/2010 | Akery |
| 7,864,920 B2 | 1/2011 | Rothschild |
| 7,873,201 B2 | 1/2011 | Eilbert |
| 7,876,879 B2 | 1/2011 | Morton |
| 7,876,880 B2 | 1/2011 | Kotowski |
| 7,903,789 B2 | 3/2011 | Morton |
| 7,924,979 B2 | 4/2011 | Rothschild |
| 7,928,400 B1 | 4/2011 | Diawara |
| 7,929,663 B2 | 4/2011 | Morton |
| 7,949,101 B2 | 5/2011 | Morton |
| 7,952,079 B2 | 5/2011 | Neustadter |
| 7,957,506 B2 | 6/2011 | Smith |
| 7,963,695 B2 | 6/2011 | Kotowski |
| 7,965,816 B2 | 6/2011 | Kravis |
| 7,995,705 B2 | 8/2011 | Allman |
| 7,995,707 B2 | 8/2011 | Rothschild |
| 8,000,436 B2 | 8/2011 | Seppi |
| 8,031,903 B2 | 10/2011 | Paresi |
| 8,039,812 B1 | 10/2011 | Crocker |
| 8,059,781 B2 | 11/2011 | Agrawal |
| 8,073,099 B2 | 12/2011 | Niu |
| 8,085,897 B2 | 12/2011 | Morton |
| 8,094,784 B2 | 1/2012 | Morton |
| 8,113,071 B2 | 2/2012 | Sagi-Dolev |
| 8,116,428 B2 | 2/2012 | Gudmundson |
| 8,135,110 B2 | 3/2012 | Morton |
| 8,173,970 B2 | 5/2012 | Inbar |
| 8,179,597 B2 | 5/2012 | Namba |
| 8,194,822 B2 | 6/2012 | Rothschild |
| 8,204,173 B2 | 6/2012 | Betcke |
| 8,223,919 B2 | 7/2012 | Morton |
| 8,233,586 B1 | 7/2012 | Boas |
| 8,243,876 B2 | 8/2012 | Morton |
| 8,263,938 B2 | 9/2012 | Bjorkholm |
| 8,275,091 B2 | 9/2012 | Morton |
| 8,275,092 B1 | 9/2012 | Zhang |
| 8,311,313 B1 | 11/2012 | Gamble |
| 8,320,523 B2 | 11/2012 | Zhang |
| 8,325,871 B2 | 12/2012 | Grodzins |
| 8,331,535 B2 | 12/2012 | Morton |
| 8,345,819 B2 | 1/2013 | Mastronardi |
| 8,389,941 B2 | 3/2013 | Bendahan |
| 8,389,942 B2 | 3/2013 | Morton |
| 8,401,270 B2 | 3/2013 | Eilbert |
| 8,439,565 B2 | 5/2013 | Mastronardi |
| 8,442,186 B2 | 5/2013 | Rothschild |
| 8,451,974 B2 | 5/2013 | Morton |
| 8,457,274 B2 | 6/2013 | Arodzero |
| 8,502,699 B2 | 8/2013 | Zerwekh |
| 8,503,605 B2 | 8/2013 | Morton |
| 8,503,606 B2 | 8/2013 | Rothschild |
| 8,532,823 B2 | 9/2013 | Mcelroy |
| 8,552,722 B2 | 10/2013 | Lionheart |
| 8,559,592 B2 | 10/2013 | Betcke |
| 8,625,735 B2 | 1/2014 | Morton |
| 8,633,823 B2 | 1/2014 | Armistead, Jr. |
| 8,690,427 B2 | 4/2014 | Mastronardi |
| 8,750,452 B2 | 6/2014 | Kaval |
| 8,766,764 B2 | 7/2014 | Rayner |
| 8,774,362 B2 | 7/2014 | Hughes |
| 8,804,899 B2 | 8/2014 | Morton |
| 8,817,098 B2 | 8/2014 | Millar |
| 8,824,632 B2 | 9/2014 | Mastronardi |
| 8,824,637 B2 | 9/2014 | Morton |
| 8,831,176 B2 | 9/2014 | Morton |
| 8,837,669 B2 | 9/2014 | Morton |
| 8,842,808 B2 | 9/2014 | Rothschild |
| 8,861,684 B2 | 10/2014 | Al-Kofahi |
| 8,884,236 B2 | 11/2014 | Rothschild |
| 8,885,794 B2 | 11/2014 | Morton |
| 8,903,045 B2 | 12/2014 | Schubert |
| 8,903,046 B2 | 12/2014 | Morton |
| 8,908,831 B2 | 12/2014 | Bendahan |
| 8,923,481 B2 | 12/2014 | Schubert |
| 8,929,509 B2 | 1/2015 | Morton |
| 8,958,526 B2 | 2/2015 | Morton |
| 8,971,484 B2 | 3/2015 | Beckmann |
| 8,971,487 B2 | 3/2015 | Mastronardi |
| 8,993,970 B2 | 3/2015 | Morton |
| 9,001,973 B2 | 4/2015 | Morton |
| 9,014,339 B2 | 4/2015 | Grodzins |
| 9,020,095 B2 | 4/2015 | Morton |
| 9,020,103 B2 | 4/2015 | Grodzins |
| 9,046,465 B2 | 6/2015 | Thompson |
| 9,048,061 B2 | 6/2015 | Morton |
| 9,052,271 B2 | 6/2015 | Grodzins |
| 9,057,679 B2 | 6/2015 | Morton |
| 9,086,497 B2 | 7/2015 | Bendahan |
| 9,093,187 B1 | 7/2015 | Johnson |
| 9,093,245 B2 | 7/2015 | Morton |
| 9,099,279 B2 | 8/2015 | Rommel |
| 9,111,331 B2 | 8/2015 | Parikh |
| 9,113,839 B2 | 8/2015 | Morton |
| 9,117,564 B2 | 8/2015 | Rommel |
| 9,146,201 B2 | 9/2015 | Schubert |
| 9,158,030 B2 | 10/2015 | Morton |
| 9,183,647 B2 | 11/2015 | Morton |
| 9,189,846 B2 | 11/2015 | Axel |
| 9,208,988 B2 | 12/2015 | Morton |
| 9,218,933 B2 | 12/2015 | Langeveld |
| 9,223,050 B2 | 12/2015 | Kaval |
| 9,257,208 B2 | 2/2016 | Rommel |
| 9,263,225 B2 | 2/2016 | Morton |
| 9,274,065 B2 | 3/2016 | Morton |
| 9,282,258 B2 | 3/2016 | Kuznetsov |
| 9,285,488 B2 | 3/2016 | Arodzero |
| 9,291,582 B2 | 3/2016 | Grodzins |
| 9,311,277 B2 | 4/2016 | Rinkel |
| 9,417,060 B1 | 8/2016 | Schubert |
| 9,420,677 B2 | 8/2016 | Morton |
| 9,442,082 B2 | 9/2016 | Morton |
| 9,442,213 B2 | 9/2016 | Bendahan |
| 9,465,135 B2 | 10/2016 | Morton |
| 9,466,456 B2 | 10/2016 | Rommel |
| 9,535,019 B1 | 1/2017 | Rothschild |
| 9,541,510 B2 | 1/2017 | Arodzero |
| 9,562,866 B2 | 2/2017 | Morton |
| 9,562,986 B2 | 2/2017 | Peyton |
| 9,576,766 B2 | 2/2017 | Morton |
| 9,606,259 B2 | 3/2017 | Morton |
| 9,618,648 B2 | 4/2017 | Morton |
| 9,632,205 B2 | 4/2017 | Morton |
| 9,632,206 B2 | 4/2017 | Parikh |
| 9,638,646 B2 | 5/2017 | Morton |
| 9,658,343 B2 | 5/2017 | Arodzero |
| 9,675,306 B2 | 6/2017 | Morton |
| 9,714,920 B2 | 7/2017 | Lionheart |
| 9,726,619 B2 | 8/2017 | Thompson |
| 9,747,705 B2 | 8/2017 | Morton |
| 9,772,426 B2 | 9/2017 | Armistead, Jr. |
| 9,823,201 B2 | 11/2017 | Morton |
| 9,823,383 B2 | 11/2017 | Hanley |
| 9,864,076 B2 | 1/2018 | Stein |
| 9,867,271 B2 | 1/2018 | Saverskiy |
| 9,891,314 B2 | 2/2018 | Morton |
| 9,989,508 B2 | 6/2018 | Awad |
| 9,996,890 B1 | 6/2018 | Cinnamon |
| 10,021,350 B2 | 7/2018 | Rayner |
| 10,048,393 B2 | 8/2018 | Stein |
| 10,061,041 B2 | 8/2018 | Rowland |
| 10,089,956 B2 | 10/2018 | Awad |
| 10,107,783 B2 | 10/2018 | Lionheart |
| 10,175,381 B2 | 1/2019 | Morton |
| 10,210,631 B1 | 2/2019 | Cinnamon |
| 10,228,487 B2 | 3/2019 | Mastronardi |
| 10,254,436 B2 | 4/2019 | Awad |
| 10,295,483 B2 | 5/2019 | Morton |
| 10,302,807 B2 | 5/2019 | Yu |
| 10,345,479 B2 | 7/2019 | Langeveld |
| 10,353,109 B2 | 7/2019 | Hanley |
| 10,366,293 B1 | 7/2019 | Faviero |
| 10,368,428 B2 | 7/2019 | Saverskiy |
| 10,386,532 B2 | 8/2019 | Morton |
| 10,408,967 B2 | 9/2019 | Morton |

(56) References Cited

U.S. PATENT DOCUMENTS

| | | |
|---|---|---|
| 10,422,919 B2 | 9/2019 | Parikh |
| 10,452,959 B1 | 10/2019 | Gautam |
| 10,453,223 B2 | 10/2019 | Cinnamon |
| 10,504,261 B2 | 12/2019 | Cinnamon |
| 10,509,142 B2 | 12/2019 | Parikh |
| 10,510,319 B2 | 12/2019 | Awad |
| 10,520,612 B2 | 12/2019 | Stein |
| 10,527,742 B2 | 1/2020 | Stein |
| 10,572,963 B1 | 2/2020 | Cinnamon |
| 10,585,206 B2 | 3/2020 | Bendahan |
| 10,593,099 B2 | 3/2020 | Sudarsky |
| 10,598,812 B2 | 3/2020 | Franco |
| 10,650,783 B2 | 5/2020 | Awad |
| 10,698,128 B2 | 6/2020 | Morton |
| 10,706,335 B2 | 7/2020 | Gautam |
| 10,768,338 B2 | 9/2020 | Yu |
| 10,770,195 B2 | 9/2020 | Rothschild |
| 10,782,440 B2 | 9/2020 | Hanley |
| 10,795,047 B2 | 10/2020 | St-Aubin |
| 10,795,048 B2 | 10/2020 | St-Aubin |
| 10,795,049 B2 | 10/2020 | St-Aubin |
| 10,809,414 B2 | 10/2020 | St-Aubin |
| 10,830,920 B2 | 11/2020 | Parikh |
| 10,901,114 B2 | 1/2021 | St-Aubin |
| 10,942,291 B2 | 3/2021 | Morton |
| 10,976,271 B2 | 4/2021 | Morton |
| 11,010,605 B2 | 5/2021 | Nord |
| 11,099,294 B2 | 8/2021 | Parikh |
| 11,119,245 B2 | 9/2021 | Morton |
| 11,163,076 B2 | 11/2021 | Stein |
| 11,193,898 B1 | 12/2021 | Schubert |
| 11,263,499 B2 | 3/2022 | Gautam |
| 11,276,213 B2 | 3/2022 | Cinnamon |
| 11,280,898 B2 | 3/2022 | Morton |
| 11,287,391 B2 | 3/2022 | Yu |
| 11,307,325 B2 | 4/2022 | Morton |
| 11,423,592 B2 | 8/2022 | Cinnamon |
| 11,448,777 B2 | 9/2022 | Stein |
| 11,561,321 B2 | 1/2023 | Morton |
| 11,594,001 B2 | 2/2023 | Sivakumar |
| 11,790,575 B2 | 10/2023 | Cinnamon |
| 11,822,041 B2 | 11/2023 | Morton |
| 11,852,775 B2 | 12/2023 | Morton |
| 11,885,752 B2 | 1/2024 | St-Aubin |
| 11,914,085 B2 | 2/2024 | Ritter |
| 11,977,037 B2 | 5/2024 | Desjeans-Gauthier |
| 12,019,035 B2 | 6/2024 | Archambault |
| 12,056,840 B2 | 8/2024 | Sivakumar |
| 12,169,264 B2 | 12/2024 | Morton |
| 12,174,334 B2 | 12/2024 | Parikh |
| 12,181,422 B2 | 12/2024 | Manalad |
| 12,181,619 B2 | 12/2024 | Stein |
| 12,235,226 B2 | 2/2025 | Morton |
| 2001/0016028 A1 | 8/2001 | Adams |
| 2001/0022830 A1 | 9/2001 | Sommer |
| 2001/0053202 A1 | 12/2001 | Mazess |
| 2002/0063783 A1 | 5/2002 | Kurase |
| 2003/0004792 A1 | 1/2003 | Townzen |
| 2003/0068557 A1 | 4/2003 | Kumashiro |
| 2003/0085348 A1 | 5/2003 | Megerle |
| 2003/0095626 A1 | 5/2003 | Anderton |
| 2003/0118246 A1 | 6/2003 | August |
| 2003/0204361 A1 | 10/2003 | Townsend |
| 2004/0016867 A1 | 1/2004 | Milshtein |
| 2004/0017313 A1 | 1/2004 | Menache |
| 2004/0017888 A1 | 1/2004 | Seppi |
| 2004/0086078 A1 | 5/2004 | Adams |
| 2004/0088584 A1 | 5/2004 | Shachar |
| 2004/0120454 A1 | 6/2004 | Ellenbogen |
| 2004/0125914 A1 | 7/2004 | Kang |
| 2004/0141584 A1 | 7/2004 | Bernardi |
| 2004/0178339 A1 | 9/2004 | Gentile |
| 2004/0199785 A1 | 10/2004 | Pederson |
| 2004/0258198 A1 | 12/2004 | Carver |
| 2004/0267114 A1 | 12/2004 | Mundy |
| 2005/0023479 A1 | 2/2005 | Grodzins |
| 2005/0031075 A1 | 2/2005 | Hopkins |
| 2005/0105680 A1 | 5/2005 | Nabors |
| 2005/0111610 A1 | 5/2005 | De Man |
| 2005/0117700 A1 | 6/2005 | Peschmann |
| 2005/0135668 A1 | 6/2005 | Polichar |
| 2005/0156734 A1 | 7/2005 | Zerwekh |
| 2005/0157842 A1 | 7/2005 | Agrawal |
| 2005/0161611 A1 | 7/2005 | Disdier |
| 2005/0169421 A1 | 8/2005 | Muenchau |
| 2005/0208290 A1 | 9/2005 | Patel |
| 2005/0226383 A1 | 10/2005 | Rifkin |
| 2005/0258371 A1 | 11/2005 | Stein |
| 2005/0275545 A1 | 12/2005 | Alioto |
| 2006/0011848 A1* | 1/2006 | Rushbrooke ......... G01N 23/083 257/E27.14 |
| 2006/0027751 A1 | 2/2006 | Kurita |
| 2006/0176998 A1 | 8/2006 | Korsunsky |
| 2006/0249685 A1 | 11/2006 | Tanaka |
| 2006/0257005 A1 | 11/2006 | Bergeron |
| 2006/0262902 A1 | 11/2006 | Wattenburg |
| 2006/0284094 A1 | 12/2006 | Inbar |
| 2007/0007455 A1 | 1/2007 | Juni |
| 2007/0009088 A1 | 1/2007 | Edic |
| 2007/0061150 A1 | 3/2007 | Sawano |
| 2007/0085010 A1 | 4/2007 | Letant |
| 2007/0098142 A1 | 5/2007 | Rothschild |
| 2007/0110215 A1 | 5/2007 | Hu |
| 2007/0140423 A1 | 6/2007 | Foland |
| 2007/0147585 A1 | 6/2007 | Eilbert |
| 2007/0159400 A1 | 7/2007 | DeJean |
| 2007/0170375 A1 | 7/2007 | Tang |
| 2007/0172129 A1 | 7/2007 | Tortora |
| 2007/0183568 A1 | 8/2007 | Kang |
| 2007/0189454 A1 | 8/2007 | Georgeson |
| 2007/0210255 A1 | 9/2007 | Bjorkholm |
| 2007/0228284 A1 | 10/2007 | Polichar |
| 2007/0235655 A1 | 10/2007 | Rhiger |
| 2007/0237294 A1 | 10/2007 | Hoff |
| 2007/0269005 A1 | 11/2007 | Chalmers |
| 2007/0272874 A1 | 11/2007 | Grodzins |
| 2007/0280416 A1 | 12/2007 | Bendahan |
| 2007/0280502 A1 | 12/2007 | Paresi |
| 2007/0286337 A1 | 12/2007 | Wang |
| 2008/0037707 A1 | 2/2008 | Rothschild |
| 2008/0043913 A1 | 2/2008 | Annis |
| 2008/0044801 A1 | 2/2008 | Modica |
| 2008/0048872 A1 | 2/2008 | Frank |
| 2008/0054893 A1 | 3/2008 | Humphreys |
| 2008/0084963 A1 | 4/2008 | Clayton |
| 2008/0128624 A1 | 6/2008 | Cooke |
| 2008/0152081 A1 | 6/2008 | Cason |
| 2008/0170655 A1 | 7/2008 | Bendahan |
| 2008/0170670 A1 | 7/2008 | Bhatt |
| 2008/0198970 A1 | 8/2008 | Kirshner |
| 2008/0205594 A1 | 8/2008 | Bjorkholm |
| 2008/0212742 A1 | 9/2008 | Hughes |
| 2008/0230709 A1 | 9/2008 | Tkaczyk |
| 2008/0260097 A1 | 10/2008 | Anwar |
| 2008/0283761 A1 | 11/2008 | Robinson |
| 2008/0298546 A1 | 12/2008 | Bueno |
| 2008/0304622 A1 | 12/2008 | Morton |
| 2009/0003514 A1 | 1/2009 | Edic |
| 2009/0010386 A1 | 1/2009 | Peschmann |
| 2009/0034790 A1 | 2/2009 | Song |
| 2009/0067575 A1 | 3/2009 | Seppi |
| 2009/0086314 A1 | 4/2009 | Namba |
| 2009/0086907 A1 | 4/2009 | Smith |
| 2009/0103686 A1 | 4/2009 | Rothschild |
| 2009/0116617 A1 | 5/2009 | Mastronardi |
| 2009/0127459 A1 | 5/2009 | Neustadter |
| 2009/0140158 A1 | 6/2009 | Clothier |
| 2009/0175411 A1 | 7/2009 | Gudmundson |
| 2009/0200373 A1 | 8/2009 | Landwirth |
| 2009/0200480 A1 | 8/2009 | Clothier |
| 2009/0213989 A1 | 8/2009 | Harding |
| 2009/0221881 A1 | 9/2009 | Qian |
| 2009/0238336 A1 | 9/2009 | Akery |
| 2009/0257555 A1 | 10/2009 | Chalmers |

(56) References Cited

U.S. PATENT DOCUMENTS

| | | |
|---|---|---|
| 2009/0274277 A1 | 11/2009 | Morton |
| 2009/0278683 A1 | 11/2009 | Carter |
| 2009/0285353 A1 | 11/2009 | Ellenbogen |
| 2009/0316855 A1 | 12/2009 | Morton |
| 2010/0002834 A1 | 1/2010 | Gudmundson |
| 2010/0020937 A1 | 1/2010 | Hautmann |
| 2010/0034353 A1 | 2/2010 | Kravis |
| 2010/0061509 A1 | 3/2010 | Raymond |
| 2010/0065746 A1 | 3/2010 | Grazioso |
| 2010/0086185 A1 | 4/2010 | Weiss |
| 2010/0098218 A1 | 4/2010 | Vermilyea |
| 2010/0161504 A1 | 6/2010 | Casey |
| 2010/0166142 A1 | 7/2010 | Du |
| 2010/0172476 A1 | 7/2010 | Morton |
| 2010/0177868 A1 | 7/2010 | Smith |
| 2010/0223016 A1 | 9/2010 | Gibson |
| 2010/0284509 A1 | 11/2010 | Oreper |
| 2010/0295689 A1 | 11/2010 | Armistead, Jr. |
| 2011/0019797 A1 | 1/2011 | Morton |
| 2011/0019799 A1 | 1/2011 | Shedlock |
| 2011/0031405 A1 | 2/2011 | Kulik |
| 2011/0038453 A1 | 2/2011 | Morton |
| 2011/0064192 A1 | 3/2011 | Morton |
| 2011/0075808 A1 | 3/2011 | Rothschild |
| 2011/0096906 A1 | 4/2011 | Langeveld |
| 2011/0102235 A1 | 5/2011 | Abdillah |
| 2011/0127426 A1 | 6/2011 | Akery |
| 2011/0135060 A1 | 6/2011 | Morton |
| 2011/0172972 A1 | 7/2011 | Gudmundson |
| 2011/0204243 A1 | 8/2011 | Bendahan |
| 2011/0206179 A1 | 8/2011 | Bendahan |
| 2011/0206240 A1 | 8/2011 | Hong |
| 2011/0222733 A1 | 9/2011 | Smith |
| 2011/0235777 A1 | 9/2011 | Gozani |
| 2011/0273320 A1 | 11/2011 | Nogueira-Nine |
| 2011/0305318 A1 | 12/2011 | Robinson |
| 2012/0069963 A1 | 3/2012 | Song |
| 2012/0081386 A1 | 4/2012 | Wiemker |
| 2012/0093367 A1 | 4/2012 | Gudmundson |
| 2012/0104276 A1 | 5/2012 | Miller |
| 2012/0134473 A1 | 5/2012 | Morton |
| 2012/0201354 A1 | 8/2012 | Kimura |
| 2012/0219116 A1 | 8/2012 | Thompson |
| 2012/0294423 A1 | 11/2012 | Cheung |
| 2012/0313555 A1 | 12/2012 | Ho |
| 2013/0156151 A1 | 6/2013 | Sugaya |
| 2013/0170611 A1 | 7/2013 | Beckmann |
| 2013/0202089 A1 | 8/2013 | Schubert |
| 2013/0208857 A1 | 8/2013 | Arodzero |
| 2013/0230139 A1 | 9/2013 | Morton |
| 2013/0251098 A1 | 9/2013 | Morton |
| 2013/0256520 A1 | 10/2013 | Korkin |
| 2013/0264483 A1 | 10/2013 | Abenaim |
| 2013/0278631 A1 | 10/2013 | Border |
| 2013/0336447 A1 | 12/2013 | Morton |
| 2014/0023181 A1 | 1/2014 | Noshi |
| 2014/0028457 A1 | 1/2014 | Reinpoldt |
| 2014/0029725 A1 | 1/2014 | Ueda |
| 2014/0063239 A1 | 3/2014 | Furness |
| 2014/0211916 A1 | 7/2014 | Morton |
| 2014/0270086 A1 | 9/2014 | Krasnykh |
| 2014/0294147 A1 | 10/2014 | Chen |
| 2014/0342631 A1 | 11/2014 | Morton |
| 2015/0104089 A1 | 4/2015 | Litvin |
| 2015/0186732 A1 | 7/2015 | Perron |
| 2015/0325010 A1 | 11/2015 | Bedford |
| 2015/0357148 A1 | 12/2015 | Morton |
| 2016/0025888 A1 | 1/2016 | Peschmann |
| 2016/0048984 A1 | 2/2016 | Frigo |
| 2016/0055650 A1 | 2/2016 | Park |
| 2016/0259412 A1 | 9/2016 | Flint |
| 2016/0343533 A1 | 11/2016 | Morton |
| 2017/0071559 A1 | 3/2017 | Kappler |
| 2017/0161922 A1 | 6/2017 | Morton |
| 2017/0215814 A1 | 8/2017 | Cales |
| 2017/0227659 A1 | 8/2017 | Stein |
| 2017/0358380 A1 | 12/2017 | Rothschild |
| 2018/0038988 A1 | 2/2018 | Morton |
| 2018/0078233 A1 | 3/2018 | Jin |
| 2018/0128754 A1 | 5/2018 | Thompson |
| 2018/0294066 A1 | 10/2018 | Rothschild |
| 2018/0333109 A1 | 11/2018 | Zamenhof |
| 2018/0368248 A1 | 12/2018 | Saverskiy |
| 2019/0178821 A1 | 6/2019 | Morton |
| 2019/0212279 A1 | 7/2019 | St-Aubin |
| 2019/0323946 A1 | 10/2019 | Myers |
| 2019/0346382 A1 | 11/2019 | Rothschild |
| 2019/0346586 A1 | 11/2019 | Scoullar |
| 2019/0369952 A1 | 12/2019 | Little |
| 2020/0042286 A1 | 2/2020 | Bui |
| 2020/0337658 A1 | 10/2020 | Sjöstrand |
| 2020/0340918 A1* | 10/2020 | Shimizu ............... G01N 21/314 |

FOREIGN PATENT DOCUMENTS

| | | |
|---|---|---|
| CA | 2744690 | 6/2009 |
| CA | 2624658 A1 | 9/2009 |
| CA | 2624663 A1 | 9/2009 |
| CA | 2636306 A1 | 9/2009 |
| CA | 2697525 A1 | 3/2010 |
| CA | 2690163 C | 8/2011 |
| CN | 1745296 A | 3/2006 |
| CN | 102175698 | 9/2011 |
| CN | 103327901 A | 9/2013 |
| CN | 104165896 B | 3/2017 |
| CN | 107209282 A | 9/2017 |
| EP | 0077018 A1 | 4/1983 |
| EP | 0176314 | 4/1986 |
| EP | 0261984 A2 | 3/1988 |
| EP | 0287707 | 10/1988 |
| EP | 0864884 A2 | 9/1998 |
| EP | 0919186 A2 | 6/1999 |
| EP | 0672332 B1 | 2/2000 |
| EP | 1135700 | 9/2001 |
| EP | 1254384 | 11/2002 |
| EP | 1413898 A1 | 4/2004 |
| EP | 1526392 | 4/2005 |
| EP | 1733213 | 12/2006 |
| EP | 1739460 A2 | 1/2007 |
| EP | 1907831 A2 | 4/2008 |
| EP | 2049888 | 4/2009 |
| EP | 2054741 | 5/2009 |
| EP | 2147297 A2 | 1/2010 |
| FR | 3037401 | 12/2016 |
| GB | 516517 A | 1/1940 |
| GB | 2023814 | 1/1980 |
| GB | 2084829 A | 4/1982 |
| GB | 2150526 A | 7/1985 |
| GB | 2255634 A | 11/1992 |
| GB | 2258321 A | 2/1993 |
| GB | 2277013 A | 10/1994 |
| GB | 2424065 A | 9/2006 |
| GB | 2438317 A | 11/2007 |
| GB | 10017382 | 2/2010 |
| JP | 2002357692 | 12/2002 |
| JP | 201351156 A | 3/2013 |
| RU | 2276352 C2 | 5/2006 |
| WO | 9002415 | 3/1990 |
| WO | 1990011507 A1 | 10/1990 |
| WO | 9718462 A | 5/1997 |
| WO | 9802763 A | 1/1998 |
| WO | 1998002763 A1 | 1/1998 |
| WO | 1998003889 A1 | 1/1998 |
| WO | 1998020366 A1 | 5/1998 |
| WO | 1998055851 A1 | 12/1998 |
| WO | 9939189 | 8/1999 |
| WO | 2004010127 A1 | 1/2004 |
| WO | 2004097889 A2 | 11/2004 |
| WO | 2004109331 | 12/2004 |
| WO | 2005050405 A2 | 6/2005 |
| WO | 2005079437 A2 | 9/2005 |
| WO | 2005098400 | 10/2005 |
| WO | 2005121756 A2 | 12/2005 |
| WO | 2006036076 A1 | 4/2006 |

(56) References Cited

FOREIGN PATENT DOCUMENTS

| WO | 2006045019 | | 4/2006 |
|---|---|---|---|
| WO | 2006078691 | A2 | 7/2006 |
| WO | 2006095188 | | 9/2006 |
| WO | 2006137919 | A2 | 12/2006 |
| WO | 2007035359 | A2 | 3/2007 |
| WO | 2007051092 | A2 | 5/2007 |
| WO | 2007068933 | A1 | 6/2007 |
| WO | 2008024825 | A2 | 2/2008 |
| WO | 2008133765 | A2 | 11/2008 |
| WO | 2009027667 | A2 | 3/2009 |
| WO | 2009106803 | A2 | 9/2009 |
| WO | 2009114928 | | 9/2009 |
| WO | 2009141613 | | 11/2009 |
| WO | 2009141615 | | 11/2009 |
| WO | 2009143169 | A1 | 11/2009 |
| WO | 2009150416 | A2 | 12/2009 |
| WO | 2011008718 | A1 | 1/2011 |
| WO | 2011053972 | A2 | 5/2011 |
| WO | 2011069024 | A1 | 6/2011 |
| WO | 2011087861 | A2 | 7/2011 |
| WO | 2011095810 | A2 | 8/2011 |
| WO | 2011095942 | A2 | 8/2011 |
| WO | 2011106463 | A1 | 9/2011 |
| WO | 2011142768 | A2 | 11/2011 |
| WO | 2012058207 | A2 | 5/2012 |
| WO | 2012080443 | | 6/2012 |
| WO | 2012174265 | A1 | 12/2012 |
| WO | 2013011282 | | 1/2013 |
| WO | 2013116549 | A1 | 8/2013 |
| WO | 2013119423 | A1 | 8/2013 |
| WO | 2014058495 | A2 | 4/2014 |
| WO | 2014107675 | | 7/2014 |
| WO | 2015134802 | | 9/2015 |
| WO | 2016081881 | A1 | 5/2016 |
| WO | 2017084898 | A1 | 5/2017 |
| WO | 2017202793 | A1 | 11/2017 |
| WO | 2018121444 | A1 | 7/2018 |
| WO | 2019217596 | A1 | 11/2019 |
| WO | 2020023603 | A1 | 1/2020 |

OTHER PUBLICATIONS

Saverskiy et al. "Cargo and Container X-Ray Inspection with Intra-Pulse Multi-Energy Method for Material Discrimination" Physics Procedia, vol. 66, pp. 232-241, ISSN 1875-3892, Jun. 18, 2015 [retrieved on May 9, 2023]. Retrieved from: <URL: https://www.sciencedirect.com/science/article/pii/S1875389215001832>.

International Search Report for PCT/US10/35048; Rapiscan Security Products, Inc.; Feb. 8, 2012.

Singh S et al., "Explosives detection systems (EDS) for aviation security", Signal Processing, Elsevier Science Publishers B.V. Amsterdam, NL, vol. 83, No. 1, Jan. 1, 2003, pp. 31-55, XP027139545, ISSN: 0165-1684.

International Search Report PCT/US2011/025969, mailed on Aug. 1, 2011, Rapiscan Systems Inc.

International Search Report and Written Opinion for PCT/US2010/041757, Oct. 12, 2010.

International Search Report for PCT/US10/58809; Rapiscan Systems Inc.; Apr. 19, 2011.

International Search Report for PCT/GB2009/001250, Mar. 2, 2010, Rapiscan Security Products Inc.

"Mobile X-Ray Inspection Systems" Internet citation Feb. 12, 2007, pp. 1-2, XP007911046 Retrieved from the Internet: URL:http://web.archive.org/web/20070212000928/http://www.bombdetection.co-m/cat.sub.-- details.php?catid=20 [retrieved on Jan. 6, 2010].

Molchanov P A et al: 'Nanosecond gated optical sensors for ocean optic applications' Sensors Applications Symposium, 2006. Proceedings of The 2006 IEEE Houston, Texas, USA Feb. 7-9, 2006, Piscataway, NJ, USA, IEEE, Feb. 7, 2006 (Feb. 7, 2006), pp. 147-150, XP010917671 ISBN: 978-0-7803-9580-0.

International Search Report PCT/US2012/024184, mailed on Jul. 27, 2012, Rapiscan Systems Inc.

International preliminary report on patentability PCT/US2012/024184, issued on Aug. 13, 2013, Rapiscan Systems Inc.

International Search Report for PCT/US2010/061908, mailed on Apr. 2, 2012, Rapiscan Systems, Inc.

International Search Report for PCT/GB2006/000859, mailed on May 19, 2006, Corus UK Ltd.

Chou, C, "Fourier coded-aperture imaging in nuclear medicine", IEEE Proc. Sci. Meas. Technol., vol. 141. No. 3, May 1994, pp. 179-184.

International Search Report and Written Opinion of the International Searching Authority, PCT/US2005/011382, Oct. 21, 2005.

European Patent Office, International Search Report, International Application No. PCT/US99/28266, dated Sep. 6, 2000, 3 pages.

International Preliminary Report on Patentability, PCT/US2005/011382, dated Oct. 19, 2006, 7 pages.

International Preliminary Examining Authority-US, International Preliminary Examination Report, PCT/US1998/018642, dated Aug. 30, 1999, 4 pages.

Mertz, L.N., et al., "Rotational aperture synthesis for x rays", Journal. Optical Society of America, vol. 3, Dec. 1986, pp. 2167-2170.

International Search Report for PCT/GB2009/001277, Jul. 20, 2010, Rapiscan Systems Inc.

International Search Report PCT/GB2009/000515, Feb. 23, 2010, Rapiscan Security Products, Inc.

International Search Report PCT/GB2009/001444, Apr. 6, 2010, Rapiscan Security Products.

International Search Report for PCT/GB2009/000556, Feb. 19, 2010, Rapiscan Security Products, Inc.

International Search Report, PCT/US2007/066936; dated: Sep. 30, 2008, 5 pages.

International Search Report, PCT/US1998/18642, dated Jul. 7, 1999, 4 pages.

International Search Report, PCT/US1999/028035, dated Sep. 15, 2000, 6 pages.

Written Opinion of the International Searching Authority, PCT/US2007/066936, dated Sep. 30, 2008, 7 pages.

International Search Report for PCT/GB2009/000497, Jan. 22, 2010.

Misso et al., "New developments in radiation detectors and electron multipliers", 1964, IEEE Transactions on Nuclear Science pp. 72-75.

International Search Report for PCT/GB2009/001275, Jul. 24, 2009, Rapiscan Security Products Inc.

Keevil, S.V., Lawinski, C.P. and Morton, E.J., 1987, "Measurement of the performance characteristics of anti-scatter grids.", Phys. Med. Biol., 32(3), 397- 403.

Morton, E.J., Webb, S., Bateman, J.E., Clarke, L.J. and Shelton, C.G., 1990, "Three-dimensional x- ray micro-tomography for medical and biological applications.", Phys. Med. Biol., 35(7), 805-820.

Morton, E.J., Swindell, W., Lewis, D.G. and Evans, P.M., 1991, "A linear array scintillation-crystal photodiode detector for megavoltage imaging.", Med. Phys., 18(4), 681-691.

Morton, E.J., Lewis, D.G. and Swindell, W., 1988, "A method for the assessment of radiotherapy treatment precision", Brit. J. Radiol., Supplement 22, 25.

Swindell, W., Morton, E.J., Evans, P.M. and Lewis, D.G., 1991, "The design of megavoltage projection imaging systems: some theoretical aspects.", Med. Phys., 18(5), 855-866.

Morton, E.J., Evans, P.M., Ferraro, M., Young, E.F. and Swindell, W., 1991, "A video frame store facility for an external beam radiotherapy treatment simulator.", Brit. J. Radiol., 64, 747-750.

Antonuk, L.E., Yorkston, J., Kim, C.W., Huang, W., Morton, E.J., Longo, M.J. and Street, R.A., 1991, "Light response characteristics of amorphous silicon arrays for megavoltage and diagnostic imaging.", Mat. Res. Soc. Sym. Proc., 219, 531-536.

Yorkston, J., Antonuk, L.E., Morton, E.J., Boudry, J., Huang, W., Kim, C.W., Longo, M.J. and Street, R.A., 1991, "The dynamic response of hydrogenated amorphous silicon imaging pixels.", Mat. Res. Soc. Sym. Proc., 219, 173-178.

(56) References Cited

OTHER PUBLICATIONS

Evans, P.M., Gildersleve, J.Q., Morton, E.J., Swindell, W., Coles, R., Ferraro, M., Rawlings, C., Xiao, Z.R. and Dyer, J., 1992, "Image comparison techniques for use with megavoltage imaging systems. ", Brit. J. Radiol., 65, 701-709.

Morton, E.J., Webb, S., Bateman, J.E., Clarke, L.J. and Shelton, C.G., 1989, "The development of 3D x-ray micro-tomography at sub 100A?Aum resolution with medical, industrial and biological applications.", Presentation at IEE colloquium "Medical scanning and imaging techniques of value in non-destructive testing", London, Nov. 3, 1989.

Antonuk, L.E., Boudry, J., Huang, W., McShan, D.L., Morton, E.J., Yorkston, J, Longo, M.J. and Street, R.A., 1992, "Demonstration of megavoltage and diagnostic x-ray imaging with hydrogenated amorphous silicon arrays.", Med. Phys., 19(6), 1455-1466.

Gildersleve, J.Q., Swindell, W., Evans, P.M., Morton, E.J., Rawlings, C. and Dearnaley, D.P., 1991, "Verification of patient positioning during radiotherapy using an integrated megavoltage imaging system.", in "Tumour Response Monitoring and Treatment Planning", Proceedings of the International Symposium of the W. Vaillant Foundation on Advanced Radiation Therapy, Munich, Germany, Ed A. Breit (Berlin: Springer), 693-695.

Lewis, D.G., Evans, P.M., Morton, E.J., Swindell, W. and Xiao, X.R., 1992, "A megavoltage CT scanner for radiotherapy verification. ", Phys. Med. Biol., 37, 1985-1999.

Antonuk, L.E., Boudry, J., Kim, C.W., Longo, M.J., Morton, E.J., Yorkston, J. and Street, R.A., 1991, "Signal, noise and readout considerations in the development of amorphous silicon photodiode arrays for radiotherapy and diagnostic x-ray imaging.", SPIE vol. 1443 Medical Imaging V: Image Physics, 108-119.

Antonuk, L.E., Yorkston, J., Huang, W., Boudry, J., Morton, E.J., Longo, M.J. and Street, R.A., 1992, "Radiation response characteristics of amorphous silicon arrays for megavoltage radiotherapy imaging.", IEEE Trans. Nucl. Sci., 39,1069-1073.

Antonuk, L.E., Yorkston, J., Huang, W., Boudry, J., Morton, E.J., Longo, M.J. and Street, R.A., 1992, "Factors affecting image quality for megavoltage and diagnostic x-ray a-Si:H imaging arrays.", Mat. Res. Soc. Sym. Proc., 258, 1069-1074.

Antonuk, L.E., Boudry, J., Yorkston, J., Morton, E.J., Huang, W. and Street, R.A., 1992, "Development of thin-film, flat-panel arrays for diagnostic and radiotherapy imaging.", SPIE vol. 1651, Medical Imaging VI: Instrumentation, 94-105.

Yorkston, J., Antonuk, L.E., Seraji, N., Boudry, J., Huang, W., Morton, E.J., and Street, R.A., 1992, "Comparison of computer simulations with measurements from a-Si:H imaging arrays.", Mat. Res. Soc. Sym. Proc., 258, 1163-1168.

Morton, E.J., Antonuk, L.E., Berry, J.E., Boudry, J., Huang, W., Mody, P., Yorkston, J. and Longo, M.J., 1992, "A Camac based data acquisition system for flat-panel image array readout", Presentation at IEEE Nuclear Science Symposium, Orlando, Oct. 25-31, 1992.

Antonuk, L.E., Yorkston, J., Huang, W., Boudry, J., Morton, E.J. and Street, R.A., 1993, "Large area, flat-panel a-Si:H arrays for x-ray imaging.", SPIE vol. 1896, Medical Imaging 1993: Physics of Medical Imaging, 18-29.

Morton, E.J., Antonuk, L.E., Berry, J.E., Huang, W., Mody, P. and Yorkston, J., 1994, "A data acquisition system for flat-panel imaging arrays", IEEE Trans. Nucl. Sci., 41(4), 1150-1154.

Antonuk, L.E., Boudry, J., Huang, W., Lam, K.L., Morton, E.J., TenHaken, R.K., Yorkston, J. and Clinthorne, N.H., 1994, "Thin-film, flat-panel, composite imagers for projection and tomographic imaging", IEEE Trans. Med. Im., 13(3), 482-490.

Gildersleve, J., Dearnaley, D., Evans, P., Morton, E.J. and Swindell, W., 1994, "Preliminary clinical performance of a scanning detector for rapid portal imaging", Clin. Oncol., 6, 245-250.

Hess, R., De Antonis, P., Morton, E.J. and Gilboy, W.B., 1994, "Analysis of the pulse shapes obtained from single crystal CdZnTe radiation detectors", Nucl. Inst. Meth., A353, 76-79.

Deantonis, P., Morton, E.J., T. Menezes, 1996, "Measuring the bulk resistivity of CdZnTe single crystal detectors using a contactless alternating electric field method", Nucl. Inst. Meth., A380, 157-159.

Deantonis, P., Morton, E.J., Podd, F., 1996, "Infra-red microscopy of CdZnTe radiation detectors revealing their internal electric field structure under bias", IEEE Trans. Nucl. Sci., 43(3), 1487-1490.

Tavora, L.M.N., Morgado, R.E., Estep, R.J., Rawool-Sullivan, M., Gilboy, W.B. and Morton, E.J., 1998, "One-sided imaging of large, dense, objects using the 511 keV photons from induced pair production", IEEE Trans. Nucl. Sci., 45(3), 970-975.

Morton, E.J., 1995, "Archaeological potential of computerised tomography", Presentation at IEE Colloquium on "NDT in archaeology and art", London, May 25, 1995.

Tavora, L.M.N. and Morton, E.J., 1998, "Photon production using a low energy electron expansion of the EGS4 code system ", Nucl. Inst. Meth., B143, 253-271.

Patel, D.C. and Morton, E.J., 1998, "Analysis of improved adiabatic pseudo- domino logic family", Electron. Lett., 34(19), 1829-1830.

Kundu, A and Morton, E.J., 1999, "Numerical simulation of argon-methane gas filled proportional counters", Nucl. Inst. Meth., A422, 286-290.

Luggar, R.D., Key, M.J., Morton, E.J. and Gilboy, W.B., 1999, "Energy dispersive X-ray scatter for measurement of oil/water ratios ", Nucl. Inst. Meth., A422, 938-941.

Morton, E.J., Crockett, G.M., Sellin, P. J. and DeAntonis, P., 1999, "The charged particle response of CdZnTe radiation detectors", Nucl. Inst. Meth., A422, 169-172.

Morton, E.J., Clark, R.J. and Crowley, C., 1999, "Factors affecting the spectral resolution of scintillation detectors", Nucl. Inst. Meth., A422, 155-158.

Morton, E.J., Caunt, J.C., Schoop, K., Swinhoe, M., 1996, "A new handheld nuclear material analyser for safeguards purposes", Presentation at INMM annual meeting, Naples, Florida, Jul. 1996.

Hepworth, S., McJury, M., Oldham, M., Morton, E.J. and Doran, S.J., 1999, "Dose mapping of inhomogeneities positioned in radiosensitive polymer gels", Nucl. Inst. Meth., A422, 756-760.

Morton, E.J., Luggar, R.D., Key, M.J., Kundu, A., Tavora, L.M.N. and Gilboy, W.B., 1999, "Development of a high speed X-ray tomography system for multiphase flow imaging", IEEE Trans. Nucl. Sci., 46 III(1), 380-384.

Tavora, L.M.N., Morton, E.J., Santos, F.P. and Dias, T.H.V.T., 2000, "Simulation of X-ray tubes for imaging applications", IEEE Trans. Nucl. Sci., 47, 1493-1497.

Tavora, L.M.N., Morton, E.J. and Gilboy, W.B., 2000, "Design considerations for transmission X-ray tubes operated at diagnostic energies", J. Phys. D: Applied Physics, 33(19), 2497-2507.

Morton, E.J., Hossain, M.A., DeAntonis, P. and Ede, A.M.D., 2001, "Investigation of Au-CdZn Te contacts using photovoltaic measurements", Nucl. Inst. Meth., A458, 558-562.

Ede, A.M.D., Morton, E.J. and DeAntonis, P., 2001, "Thin-film CdTe for imaging detector applications", Nucl. Inst. Meth., A458, 7-11.

Tavora, L.M.N., Morton, E.J. and Gilboy, W.B., 2001, "Enhancing the ratio of fluorescence to bremsstrahlung radiation in X-ray tube spectra", App. Rad. and Isotopes, 54(1), 59-72.

Menezes, T. and Morton, E.J., 2001, "A preamplifier with digital output for semiconductor detectors", Nucl. Inst. Meth. A., A459, 303-318.

Johnson, D.R., Kyriou, J., Morton, E.J., Clifton, A.C. Fitzgerald, M. and MacSweeney, J.E., 2001, "Radiation protection in interventional radiology", Clin. Rad., 56(2), 99-106.

Tavora, L.M.N., Gilboy, W.B. and Morton, E.J., 2001, "Monte Carlo studies of a novel X-ray tube anode design", Rad. Phys. and Chem., 61, 527-529.

"Morton, E.J., 1998, "Is film dead: the flat plate revolution", Keynote Talk, IPEM Annual Conference, Brighton, 14-17 Sept, 1998"}.

Luggar, R.D., Morton, E.J., Jenneson, P.M. and Key, M.J., 2001, "X-ray tomographic imaging in industrial process control", Rad. Phys. Chem., 61, 785-787.

Luggar, R.D., Morton, E.J., Key, M.J., Jenneson, P.M. and Gilboy, W.B., 1999, "An electronically gated multi-emitter X-ray source for high speed tomography", Presentation at SPIE Annual Meeting, Denver, Jul. 19-23, 1999.

(56) References Cited

OTHER PUBLICATIONS

Gregory, P.J., Hutchinson, D.J., Read, D.B., Jenneson, P.M., Gilboy, W.B. and Morton, E.J., 2001, "Non-invasive imaging of roots with high resolution X-ray microtomography", Plant and Soil, 255(1), 351-359.

Kundu, A., Morton, E.J., Key, M.J. and Luggar, R.D., 1999, "Monte Carlo simulations of microgap gas-filled proportional counters", Presentation at SPIE Annual Meeting, Denver, Jul. 19-23, 1999.

Hossain, M.A., Morton, E.J., and Ozsan, M.E., 2002, "Photoelectronic investigation of CdZn Te spectral detectors", IEEE Trans. Nucl. Sci, 49(4), 1960-1964.

Panman, A., Morton, E.J., Kundu, A and Sellin, P.J., 1999, "Optical Monte Carlo transport in scintillators", Presentation at SPIE Annual Meeting, Denver, Jul. 19-23, 1999.

Jenneson, P.M., Gilboy, W.B., Morton, E.J., and Gregory, P.J., 2003, "An X-ray micro-tomography system optimised for low dose study of living organisms", App. Rad. Isotopes, 58, 177-181.

Key, M.J., Morton, E.J., Luggar, R.D. and Kundu, A., 2003, "Gas microstrip detectors for X-ray tomographic flow imaging", Nucl. Inst. Meth., A496, 504-508.

Jenneson, P.M., Luggar, R.D., Morton, E.J., Gundogdu, O, and Tuzun, U, 2004, "Examining nanoparticle assemblies using high spatial resolution X-ray microtomography", J. App. Phys, 96(5), 2889-2894.

Tavora, L.M., Gilboy, W.B. and Morton, E.J., 2000, "Influence of backscattered electrons on X-ray tube output", Presentation at SPIE Annual Meeting, San Diego, 30 July - Aug. 3, 2000.

Wadeson, N., Morton, E.J., and Lionheart, W.B., 2010, "Scatter in an uncollimated x-ray CT machine based on a Geant4 Monte Carlo simulation", SPIE Medical Imaging 2010: Physics of Medical Imaging, Feb. 15-18, 2010, San Diego, USA.

Morton, E.J., 2010, "Position sensitive detectors in security: Users perspective", Invited talk, STFC meeting on position sensitive detectors, RAL, May 2010.

Third Party Submission Under 37 CFR 1.290 for U.S. Appl. No. 15/954,853, filed Apr. 19, 2019.

Domingo Mery, "Computer Vision for X-Ray Testing: Imaging, Systems, Image Databases, and Algorithms", Springer International Publishing Switzerland 2015 (Year: 2015).

Chen C et al., "Front-end electronics for the CDF-II time-of-flight system", IEEE Transactions On Nuclear Science, IEEE Service Center, New York, Ny, US, (20031201), vol. 50, No. 6, doi:10.1109/TNS.2003.820632, ISSN 0018-9499, pp. 2486-2490, XP011106678.

[XAI] - Wen Xianfei et al., "Measuring the scintillation decay time for different energy deposited by [gamma]-rays and neutrons in a Cs2LiYCl6:Ce3+detector", Nuclear Instruments & Methods in Physics Research. Section A: Accelerators, Spectrometers, Detectors, and Associated Equipment, Elsevier Bv * North-Holland, Nl, (20170209), vol. 853, doi:10.1016/J.NIMA.2017.02.019, ISSN 0168-9002, pp. 9-15, XP029936730.

Kyle Polack et al. "Dual-Particle Imager for Standoff Detection of Special Nuclear Material", IEEE Nuclear Science Symposium Conference Record, Oct. 23, 2011, pp. 1494-1500, IEEE.

Soundara-Pandian L et al., "Lithium Alkaline Halides-Next Generation of Dual Mode Scintillators", IEEE Transactions On Nuclear Science, IEEE Service Center, New York, Ny, US, vol. 63, No. 2, doi:10.1109/TNS.2016.2535355, ISSN 0018-9499, (20160401), pp. 490-496, (20160418), XP011606934.

\* cited by examiner

METHODS AND SYSTEMS FOR PERFORMING ON-THE-FLY AUTOMATIC CALIBRATION ADJUSTMENTS OF X-RAY INSPECTION SYSTEMS

CROSS-REFERENCE

The present application relies on U.S. Patent Provisional Application No. 63/369,386, titled "Methods and Systems for Performing On-The-Fly Automatic Calibration Adjustments of X-Ray Inspection Systems", and filed on Jul. 26, 2022, for priority, which is herein incorporated by reference in its entirety.

FIELD

The present specification is related generally to the field of X-ray inspection. More specifically, the present specification is related to a method of enabling automatic adjustment of calibration data of X-ray inspection systems while scanning an object under examination or inspection.

BACKGROUND

Most modern high energy (2.5-9 MeV) transmission X-ray non-intrusive inspection systems offer some degree of cargo composition estimation by using interlaced dual energy pulses. By comparing the radiographic images of the low energy (3-5 MeV) and high energy (6-9 MeV) of the same container, different regions inside it can be characterized into four broad categories of materials: organic, inorganic (such as soil, fertilizer, salts, aluminum), metallic (such as steel, scrap metal), and High-Z materials (such as materials having an atomic number at or above tungsten).

Unlike the low energy inspection systems used for parcel and luggage screening where the prevailing process is the photoelectric effect, at high energies, the Compton effect dominates the interaction of X-rays with matter. The Compton process is weakly dependent on the effective atomic number of the material, making an accurate assessment difficult.

In addition to the challenges brought by physics, there are other challenges specific to the cargo screening such as, but not limited to: a) cargo clutter, where multiple optically dense objects overlap in the image; b) X-ray source stability (in terms of maintaining a consistent and/or predictable value for dose and energy) and detector stability, both of which may lead to calibration drift; c) energy-dependent X-ray scatter, where low and high energy beams produce different blur in the image and d) obscured objects of interest (such as high-Z shielding, weapons, or smuggled drug packages), which are often small compared to the rest of the imaged cargo.

Dual energy material separation methods involve a calibration process in which a set of materials with known atomic numbers and densities such as plastic, aluminum, steel, lead, tungsten, with different thicknesses are placed between the source and detectors, a scan is performed and responses of detectors for the high and low energy beam components are recorded. In normal operation mode, the inverse process takes place. Detectors record the high and low energy response to objects in the beam, and then algorithms determine the closest candidate, based on an effective atomic number (Zeff), in terms of material type and thickness. An uncertainty is associated with the determination of the material type, depending on the system geometry, X-ray flux and energies, and the number of samples (pulse pairs) used to make the determination.

Unfortunately, materials separation calibration does not remain stable over the lifetime of an X-ray inspection system. Changes often appear that make the Zeff calculation unreliable. In some conditions, the drift may even happen between two scans taken minutes apart.

Therefore, there is a need for a method that enables automatic modulation of calibration data for an X-ray system during scanning of an object under examination or inspection.

SUMMARY

The following embodiments and aspects thereof are described and illustrated in conjunction with systems, tools and methods, which are meant to be exemplary and illustrative, and not limiting in scope. The present application discloses numerous embodiments.

In some embodiments, the present specification discloses a method of performing an on-the-fly adjustment of calibration data corresponding to an X-ray inspection system that comprises an X-ray source in data communication with a computing device, the method being implemented in the computing device having one or more physical processors programmed with a plurality of program instructions that, when executed by the one or more physical processors, cause the computing device to perform the method, the method comprising: generating, by the X-ray inspection system, a first plurality of calibration data, wherein the first plurality of calibration data is stored in a memory associated with the computing device; generating, using the X-ray inspection system, data representative of X-ray scan images of a cargo container; segmenting data representative of X-ray scan images into a plurality of regions of interest, wherein at least some of the plurality of regions of interest contain only one type of material having at least one of a known effective atomic number (Zeff) or a known HS code; determining, using the first plurality of calibration data, first data indicative of Zeff of the at least some of the plurality of regions of interest; comparing the first data with second data indicative of Zeff corresponding to the known Zeff or known HS code; adjusting the first plurality of calibration data to generate a second plurality of calibration data if the first and second data differ more than a predefined threshold; and using the second plurality of calibration data to process the data representative of X-ray scan images to generate and display X-ray scan images.

Optionally, the method further comprises calculating a Zeff value for each pixel in the X-ray scan images; applying a smoothing algorithm to the Zeff values of multiple pixels, associated with each of the plurality of regions of interest, in order to generate smoothed Zeff-based regions of interest; applying a predefined color map to the smoothed Zeff-based regions of interest; and displaying the color-coded X-ray scan images.

Optionally, the Zeff value for each pixel is calculated using the second plurality of calibration data if the first and second data differ more than the predefined threshold, and wherein the Zeff value for each pixel is calculated using the first plurality of calibration data if the first and second data do not differ more than the predefined threshold.

Optionally, the smoothing algorithm includes any one of simple running averages, shape preserving smoothing filters, image-guided segmentation or K-means clustering.

Optionally, the at least some of the plurality of regions of interest correspond to empty or unobstructed regions of the cargo container.

Optionally, the at least some of the plurality of regions of interest correspond to at least one of a volume encompassing only a top surface of the cargo container, a volume encompassing only a front end of the cargo container, or a volume encompassing only a rear end of the cargo container.

Optionally, the first plurality of calibration data is generated by: placing, between a radiation source and detectors of the X-ray inspection system, a set of materials with known atomic numbers and densities, wherein the set of materials have different thicknesses; and recording responses of the detectors for each of the set of materials.

Optionally, the X-ray scan images correspond to low and high energies of the radiation source.

In some embodiments, the present specification is directed towards an X-ray inspection system comprising: a radiation source; an array of detectors; a computing device in data communication with the radiation source and the array of detectors, wherein the computing device has one or more physical processors programmed with a plurality of program instructions that, when executed by the one or more physical processors, cause the computing device to generate, using the X-ray inspection system, a first plurality of calibration data, wherein the first plurality of calibration data are stored in a memory associated with the computing device; generate, using the X-ray inspection system, X-ray scan images of a cargo container; segment the X-ray scan images into a plurality of regions of interest, wherein each of the plurality of regions of interest contain a single type of a material associated with a known atomic number or a single type of a material associated with a known HS code; determine, using the first plurality of calibration data, first data indicative of a first effective atomic number of the single type of the material associated with the known atomic number or a second effective atomic number of the single type of the material associated with the known HS code for each of the plurality of regions of interest; compare the first data with second data indicative of a known effective atomic number corresponding to the material associated with the known atomic number or a known effective atomic number corresponding to the material associated with the known HS code; adjust the first plurality of calibration data to generate a second plurality of calibration data if the first and second data differ significantly; and replace the first plurality of calibration data by the second plurality of calibration data in the memory.

Optionally, the plurality of program instructions, when executed by the one or more physical processors, further cause the computing device to: calculate an effective atomic number value for each pixel in the X-ray scan images; apply a smoothing algorithm to the effective atomic number values of multiple pixels, associated with each of the plurality of regions of interest, in order to generate smoothed effective atomic number-based regions of interest; apply a predefined color map to the smoothed effective atomic number-based regions of interest; and display the color coded X-ray scan images.

Optionally, the effective atomic number value for each pixel is calculated using the second plurality of calibration data if the first and second data differ significantly, and wherein the effective atomic number value for each pixel is calculated using the first plurality of calibration data if the first and second data do not differ significantly.

Optionally, the smoothing algorithm includes any one of simple running averages, shape preserving smoothing filters, image-guided segmentation or K-means clustering.

Optionally, at least some of the plurality of regions of interest are empty or unobstructed.

Optionally, at least some of the plurality of regions of interest contain correspond to at least one of a volume encompassing only a top surface of the cargo container, a volume encompassing only a front end of the cargo container, or a volume encompassing only a rear end of the cargo container.

Optionally, the first plurality of calibration data is generated by: placing, between a radiation source and detectors of the X-ray inspection system, a set of materials with known atomic numbers and densities, wherein the set of materials have different thicknesses; and recording response of the detectors for each of the set of materials.

Optionally, the X-ray scan images correspond to low and high energies of the radiation source.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
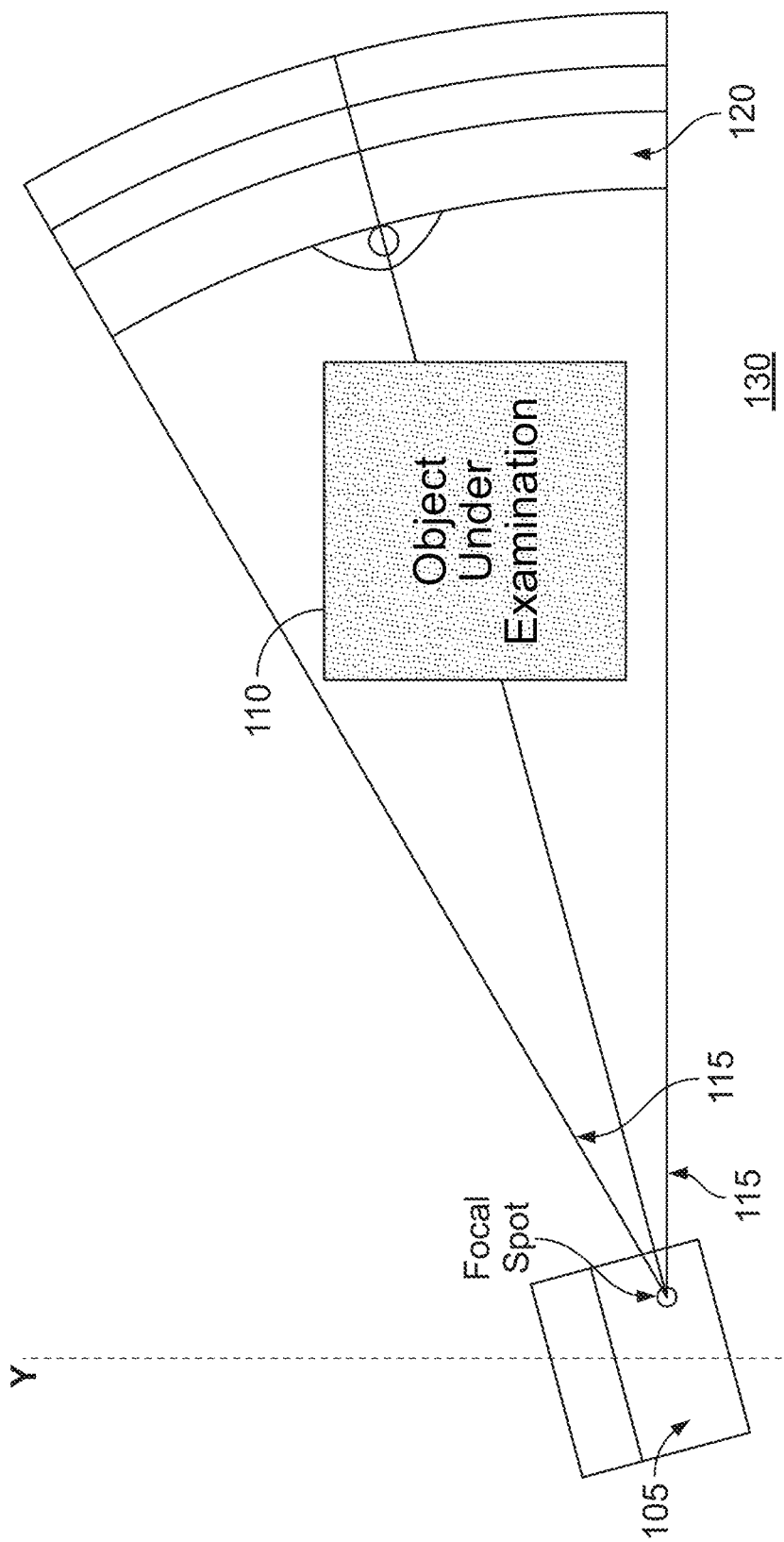
FIG. 1 is a schematic drawing of an exemplary LINAC-based high-energy X-ray cargo inspection system that may implement a method described in the present specification in an embodiment.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

"On-the-fly adjustment" refers to performing an adjustment to calibration data 1) immediately after a scan has occurred (first scan) and before an immediately subsequent scan is performed, 2) based on the scan data that was just acquired from the first scan, and 3) without manual or human intervention.

Overview

FIG. 1 illustrates an exemplary LINAC-based high-energy X-ray cargo inspection system that may be configured and used, in an embodiment, to implement the method(s) described in the present specification. As shown, the cargo inspection system 130 comprises a high-energy radiation source 105 for irradiating an object under inspection 110 with a vertically divergent fan beam of radiation 115. The high-energy radiation source 105 may be, but is not limited to, a linear accelerator (LINAC) or Betatron. In embodiments, the LINAC or any other source provides a radiation dose sufficient for imaging containers and cargo. In an embodiment, the energy and dose output of the LINAC or any other source ranges from 750 keV to 10 MeV and 0.07 Gy/min to 15 Gy/min, respectively.

The choice of source type, source intensity, and energy output depends upon the sensitivity of the detectors, the radiographic density of the cargo positioned in the space between the source and detectors, radiation safety considerations, and operational requirements, such as the inspection speed. One of ordinary skill in the art would appreciate the factors that need to be considered when selecting a radiation source type depend upon inspection requirements. In one embodiment, where the object under inspection 110 is a large-sized container or car that highly attenuates the X-ray beam, the radiation may be from an X-ray source operating at an energy ranging from approximately 750 keV and even up to 10 MeV or more. In various embodiments, the object under inspection 110 may be a vehicle, truck, rail car or other containers for carrying cargo, passenger luggage or general belongings.

The cargo inspection system 130 further comprises a detector array 120, which is preferably positioned behind the object under inspection 110 and is configured to and used to detect radiation transmitted through the object under inspection 110. The detectors 120, in an embodiment, are formed by a stack of crystals that generate analog signals when X-rays impinge upon them, with the signal strength proportional to the amount of beam attenuation in the object under inspection 110. In one embodiment, the X-ray beam detector arrangement consists of a linear array of solid-state detectors of the crystal-diode type. A typical arrangement uses cadmium tungstate scintillating crystals to absorb the X-rays transmitted through the object under inspection 110 and to convert the absorbed X-rays into photons of visible light. Crystals such as bismuth germinate, sodium iodide or other suitable crystals may be alternatively used as known to a person of ordinary skill in the art. The crystals can be directly coupled to a suitable detector, such as a photodiode or photo-multiplier. The detector photodiodes may be linearly arranged, which through unity-gain devices, provide advantages over photo-multipliers in terms of operating range, linearity and detector-to-detector matching. In another embodiment, an area detector is used as an alternative to linear array detectors. Such an area detector may be a scintillating strip, such as cesium iodide or other materials known in the art, viewed by a suitable camera or optically coupled to a charge-coupled device (CCD).

It would be apparent to persons of skill in the art that the cargo inspection system 130 shown in FIG. 1 is just one example of an inspection system employing high-energy X-ray sources such as, but not limited to LINAC or Betatron. In some embodiments, the radiation source 105 uses interlaced dual energy pulses in order to generate X-ray scan images of low energy (3-5 MeV) and high energy (6-9 MeV) of the object under inspection 110.

Calibration Drift

The present specification recognizes that calibration data for materials separation does not remain stable over the lifetime of an X-ray inspection system. Changes in calibration, also referred to as "calibration drift" often appear and render the Zeff (effective atomic number) calculation unreliable for effective materials separation data. In some conditions, the drift may happen even between two scans taken minutes apart. The following sources, factors, causes or variables may all contribute to calibration drift. The X-ray source itself may be a contributing cause of calibration drift. Dose drift may be induced by beam current or beam energy changes. These include magnet changes (Betatron), automatic frequency control (AFC) shift, and wave guide temperature variation. Beam formation mechanics, which may include collimator alignment casting shadows, detector stack boom oscillations, detector collimator fins shift may also contribute to calibration drift. In addition, X-ray detectors may have problems with photodiode dark current and scintillator light yield, which contribute to calibration drift.

More than one cause of calibration shift may occur at the same time. However, only a few of the sources, factors, causes or variables of calibration drift have built-in mechanisms for compensation such as, for example, reference detectors and dark current measurement at the beginning of a scan or in-between pulses. These sources, factors, causes or variables of calibration drift are generally non-linear and are often linked with each other in complicated ways. Also, full recalibration is time consuming and is only a temporary solution for causes such as temperature excursions or slight magnetic drift (in a Betatron) or AFC drift (in a LINAC).

Automatic Adaptive Calibration

In accordance with aspects of the present specification, instead of parametrizing the contribution of each source, factor, cause or variable to the calibration drift, a phenomenological model is developed in which the system is configured to check an accuracy of the Zeff calculation in almost every scan and in which the system is configured to automatically adjust the calibration data in order to improve scan data, and in particular, materials separation accuracy.

Figure 2A:
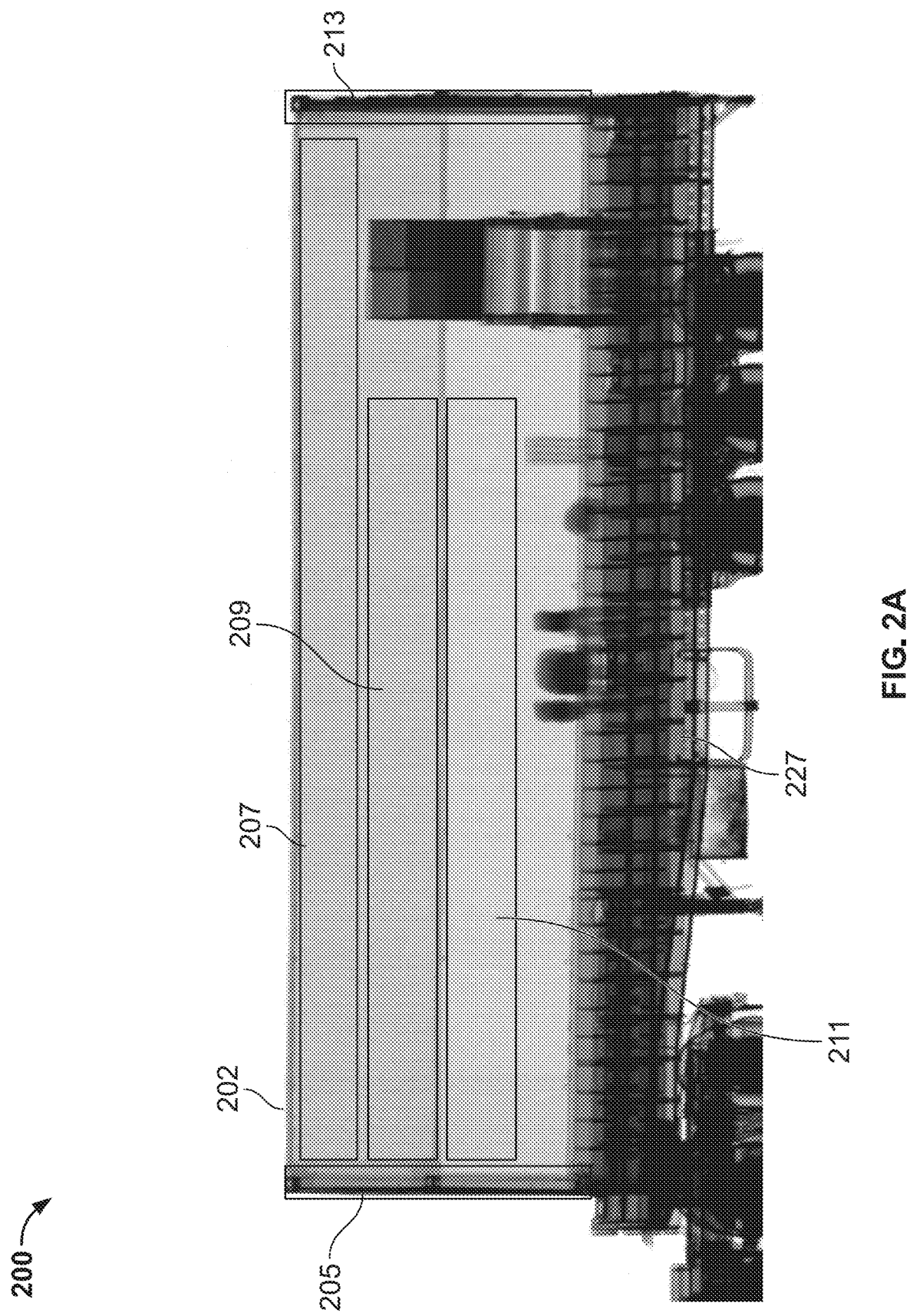
FIG. 2A shows segmented regions of a radiographic scan image of a cargo container, in accordance with some embodiments of the present specification.

FIG. 2A shows segmented regions of a radiographic scan image 200 of a cargo container 202, in accordance with some embodiments of the present specification. In a non-limiting exemplary scenario, the image 200 has at least five regions or sections (also referred to as regions or sections of interest), that is, first region 205, second region 207, third region 209, fourth region 211, and fifth region 213 for which the material is conventionally known to be steel (for ISO containers, for example). Also, for the at least five regions 205, 207, 209, 211, 213 the attenuation and angular range (relative to a central axis of an X-ray beam used to scan the cargo container 202) vary enough. In embodiments, the regions are selected for different purposes. For example, referring to FIG. 2A, and by way of example only, regions 207, 209, and 211 are selected for stability since the variation is relatively small compared to regions 205 and 213, which are selected to have large angular coverage and varying attenuations.

In embodiments, a radiographic scan image, such as the image 200 of the cargo container 202, is segmented into one or more regions or sections of interest based on a variability of attenuation and an angular range relative to the central axis of the X-ray beam. In some embodiments, the one or more regions or sections of interest are selected such that the expected attenuation (of the regions or sections of interest) varies more than 10% and the angular range or span is greater than 2 degrees relative to the central axis of the X-ray beam.

Containers, such as the cargo container 202, typically have one or more regions such as, for example, a front end (comprising first region 205) and a rear end (comprising fifth region 213) and a top portion (comprising second region 207, third region 209, and fourth region 211) that remain unobstructed. It should be noted that the fifth region 213 and at least the second top region 207 are almost always unobstructed for most cargo containers. The first region or front end 205 is also unobstructed in most cases. The second region 207, third region 209, and fourth region 211 are illustrative non-limiting examples of areas or portions in the image 200 that are found to be unobstructed and that can be used for calibration adjustment. These regions will, however, differ on a case-by-case basis depending on how a container is loaded. In some embodiments, a bottom surface or portion 227 of the cargo container 202 may also be at least partially unobstructed (with known container material). Therefore, in various embodiments, an X-ray scan image of a container is analyzed and segmented to identify regions or areas for which material composition is known, wherein such regions or areas of known material composition include portions inside or within the container such as, but not limited to, unobstructed regions (that is, regions not loaded with cargo) of the container, and portions outside the container such as, but not limited to, tires, windshield, vehicle frame around axles and fuel or gas tank.

For example, in one embodiment, the region of interest comprising the top portion (comprising at least one of the second region 207, third region 209, and fourth region 211) of the cargo container 202 is made of only the material that separates the internal volume of the cargo container 202 from the outside environment. In another embodiment, the material that separates the internal volume of the cargo container 202 from the outside environment makes up at least 20%, 30%, 40%, 50%, 60%, 70%, 80%, 90%, or any numerical increment between 20% and 90% of the region of interest comprising the top portion of the cargo container 202.

In another example, in one embodiment, the region of interest comprising the front end (comprising first region 205) of the cargo container 202 is made of only the material that separates the internal volume of the cargo container 202 from the outside environment. In another embodiment, the material that separates the internal volume of the cargo container 202 from the outside environment makes up at least 20%, 30%, 40%, 50%, 60%, 70%, 80%, 90%, or any numerical increment between 20% and 90% of the region of interest comprising the front end of the cargo container 202.

In yet another example, in one embodiment, the region of interest comprising the rear end (comprising fifth region 213) of the cargo container 202 is made of only the material that separates the internal volume of the cargo container 202 from the outside environment. In another embodiment, the material that separates the internal volume of the cargo container 202 from the outside environment makes up at least 20%, 30%, 40%, 50%, 60%, 70%, 80%, 90%, or any numerical increment between 20% and 90% of the region of interest comprising the rear end of the cargo container 202.

In still another example, in one embodiment, the region of interest comprising the bottom surface or portion 227 of the cargo container 202 is made of only the material that separates the internal volume of the cargo container 202 from the outside environment. In another embodiment, the material that separates the internal volume of the cargo container 202 from the outside environment makes up at least 20%, 30%, 40%, 50%, 60%, 70%, 80%, 90%, or any numerical increment between 20% and 90% of the region of interest comprising the bottom surface or portion of the cargo container 202.

Also, the first region 205 and fifth region 213 are of interest because of the angular coverage or span of more than 15 degrees off the central axis of the X-ray beam. As known to persons of ordinary skill in the art, due to the physics of X-ray production, the shape of an attenuation curve is expected to change if the energy of the electrons producing the X-rays changes. High energy beams have flux and energy composition roll-off as a function of angle relative to the central axis of the X-ray beam. The roll-off function is different at 4 MeV versus 6 MeV. In some embodiments, the change, drift or modification of the calibration curves is determined by calculating the variation of the roll-off curves.

In accordance with some embodiments, the unobstructed regions, such as second region 207, third region 209, and fourth region 211, are identified and used as data points. In some embodiments, machine learning techniques such as, but not limited to, mask R-CNNs (Region-based Convolutional Neural Networks) or U-Nets are configured to segment the image 200 for more features inside and outside the cargo container 202 suitable for use in automatic calibration adjustments.

Figure 2B:
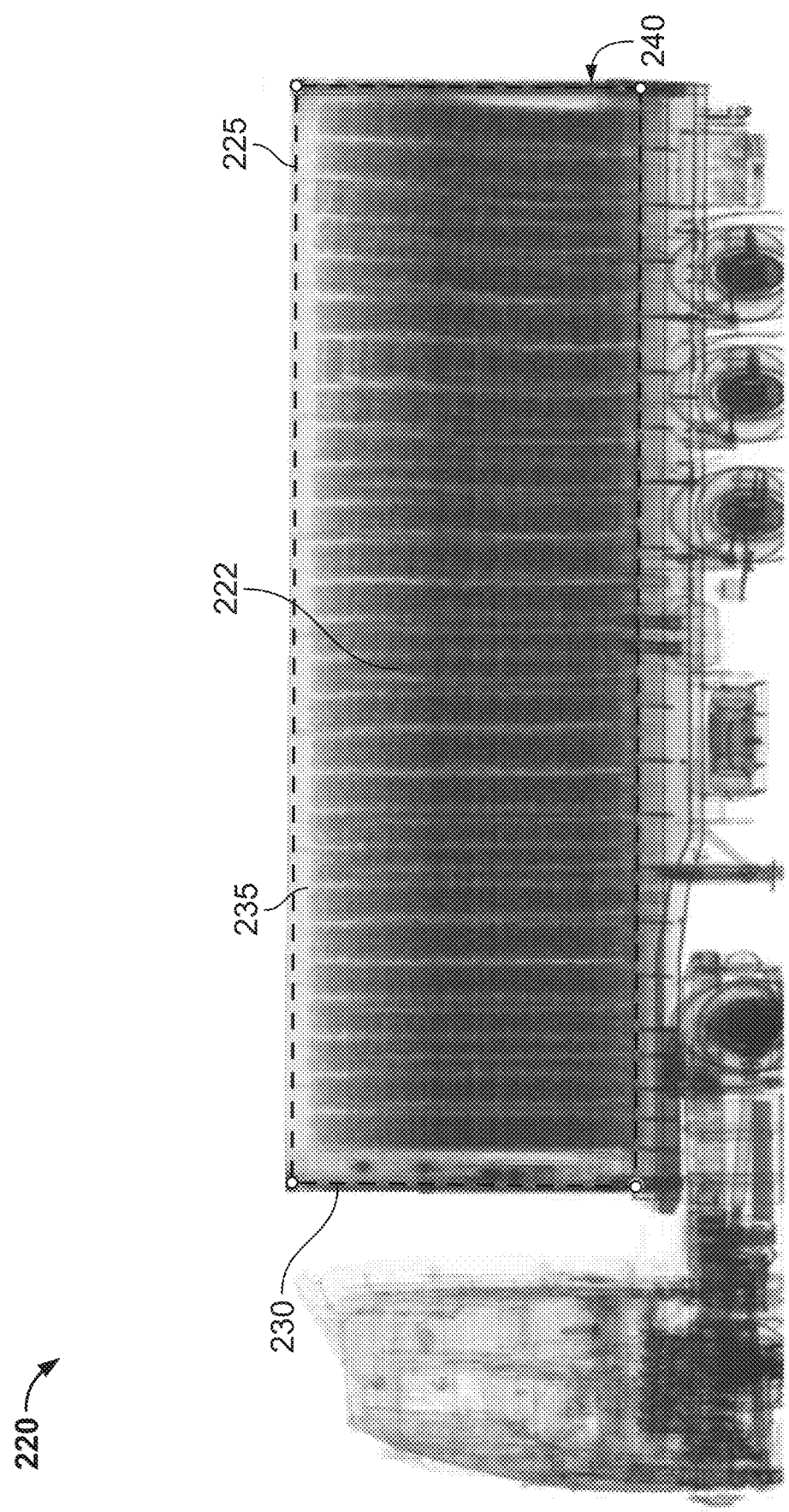
FIG. 2B shows a radiographic scan image of a container housing bananas, in accordance with some embodiments of the present specification.

In some embodiments, for scans that have the HS code associated with the X-ray image, the cargo inside the container is used to check and adjust, if required, the calibration data. For example, FIG. 2B shows a radiographic scan image 220 of a container 230 housing bananas, in accordance with some embodiments of the present specification. The dotted box 225 shows that the cargo segmentation algorithm successfully identified the cargo region 222 inside the refrigerated ISO container 230.

In accordance with various embodiments, there are multiple other sections or regions inside the container 230 that can be used to check and, if required, adjust the calibration data. The top edge region 235 of the container 230 is metallic and uncluttered, the back edge 240 of the container 230 is also metallic and spans a large angular range relative to a central axis of an X-ray beam used to scan the container 230. Inside, the bananas 222 are organic with a large angular and attenuation coverage.

Thus, in embodiments, the present specification is directed towards a radiographic or X-ray image processing method of identifying or segmenting one or more regions or sections of interest of a cargo container for which the materials are known and that have associated large angular and attenuation coverage. In various embodiments, the one or more regions or sections of interest have an associated angular span of more than 2 degrees and an attenuation variation of more than 10% relative to the mean inside each of the one or more regions or sections of interest. Thus, in embodiments, this refers to particular values relative to the values within the region itself. As an non-limiting example, this may represent regions 205 and 213. Thereafter, the method computationally links the variation of Zeff values of the identified or segmented regions of interest relative to the current calibration and adjusts the parameters of the calibration curves to match with known materials.

In embodiments, the regions of interest may become obstructed by known features and materials, such as, for example, the skin of the cargo container. In order to be a region of interest, a condition is being able to determine (or having a way of knowing) what material is contained by the region of interest. This information is obtained either through the identification of known features (for example, cargo container parts, vehicle tires, windshield, etc.), HS codes, or other ways of identifying an object. For example, a machine learning algorithm may be configured to identify tires, ceramic tiles or engine blocks inside the cargo container as these are made of known materials.

Figure 3:
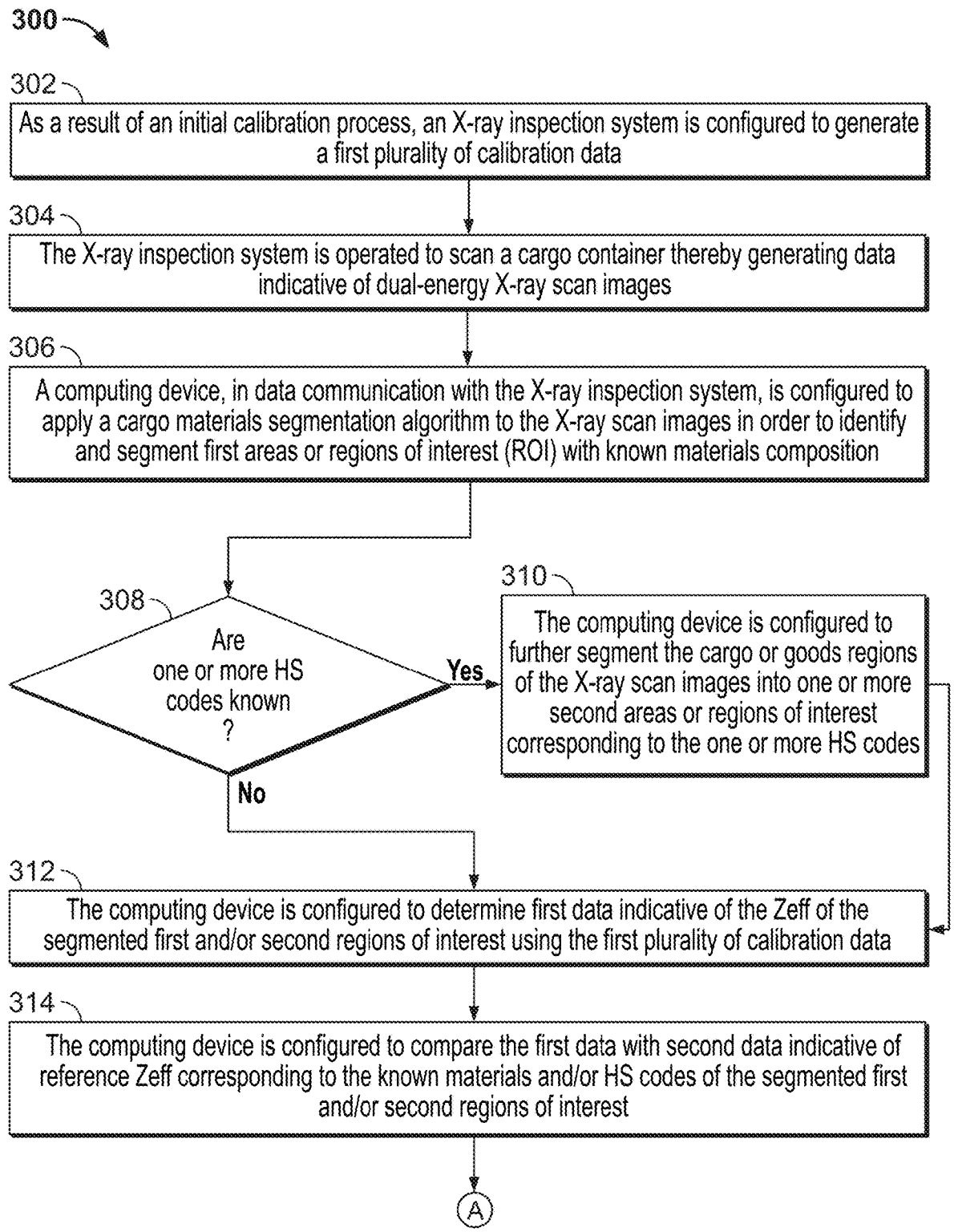
FIG. 3 is a flowchart of a plurality of exemplary steps of a method of processing X-ray scan images of an object under inspection for materials classification and on-the-fly automatic adaptive calibration, in accordance with some embodiments of the present specification.
Figure 3:
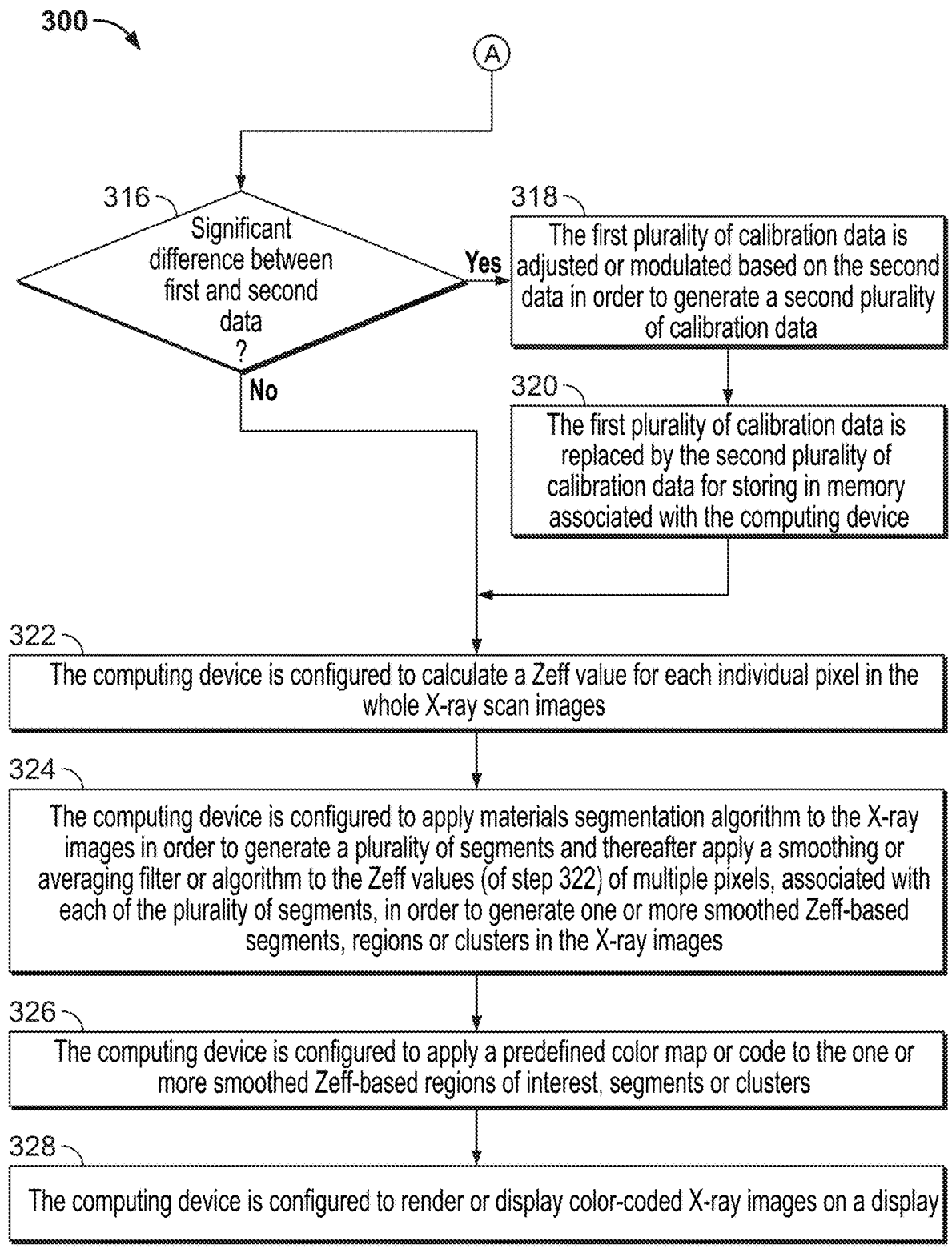

FIG. 3 is a flowchart of a plurality of exemplary steps of a method 300 of processing X-ray scan images of an object under inspection for materials classification and on-the-fly automatic adaptive adjustment of calibration data, in accordance with some embodiments of the present specification. In embodiments, the method 300 comprises a plurality of programmatic instructions or code stored in a non-transient memory associated with a computing device that is in data communication with an X-ray inspection system configured to generate the X-ray scan images. The computing device includes a processor and random access memory, wherein the processor executes the method 300.

In some embodiments, the X-ray inspection system is configured to use interlaced dual energy pulses in order to generate the X-ray scan images of low energy (3-5 MeV) and high energy (6-9 MeV) of the cargo container. In various embodiments, the object under inspection may be a vehicle, truck, rail car or other containers for carrying cargo, passenger luggage or general belongings. In a non-limiting exemplary scenario, the steps of the method 300 are being described with reference to a cargo container scanned using a dual-energy X-ray inspection system. Alternate embodiments may use a single-energy X-ray inspection system. Further, embodiments may use a multi-view X-ray inspection system having single or dual-energy capabilities.

At step 302, as a result of an initial calibration process, the X-ray inspection system is configured to generate a first plurality of calibration data. The first plurality of calibration data is stored in the non-transient memory associated with the computing device. In the initial calibration process, a set of materials with known atomic numbers and densities such as plastic, aluminum, steel, lead, tungsten, with different thicknesses is put between the X-ray source and detectors (of the X-ray inspection system) and the response of the detectors, for the high and low energy beam components, is recorded corresponding to the first plurality of calibration data.

At step 304, the X-ray inspection system is operated to scan a cargo container, thereby generating data indicative of dual-energy X-ray scan images. At step 306, the computing device is configured to apply a cargo materials segmentation algorithm, known to persons of ordinary skill in the art, to the X-ray scan images in order to identify and segment first areas or regions of interest (ROI) with known materials composition (in some embodiments, the first areas or regions of interest contain only one type of material having a known effective atomic number (Zeff)). For example, for an ISO container, the first areas or regions of interest include top and ends (front and rear) that may be unobstructed and known to be of steel. The unobstructed areas or regions may also include those portions of the container that are empty or devoid of the presence of any cargo or goods. In further examples, the first areas or regions of interest may additionally include tires, the windshield, vehicle frame around axles and fuel tank.

It should be appreciated that calibration curves are non-linear. Although a single region or section of interest can be used for materials classification and on-the-fly automatic adaptive adjustment of calibration data, the greater the number of regions or sections of interest are processed, the more accurate the recalibration or adjustment of calibration data becomes.

At step 308, the computing device is configured to determine if one or more HS (Harmonized Commodity Description and Coding System) codes, associated with the cargo or goods of the cargo container and therefore the X-ray scan images, are known. HS codes are identification codes given to goods for use in international trade. The HS codes are administered by the World Customs Organization (WCO) and are internationally accepted for use by customs authorities and companies to identify goods/cargo.

If the one or more HS codes are known, then at step 310, the computing device is configured to further segment the cargo or goods regions of the X-ray scan images into one or more second areas or regions of interest corresponding to the one or more HS codes and subsequently the flow moves to step 312. At step 312, the computing device is configured to determine first data indicative of the Zeff of the segmented first and/or second regions of interest using the first plurality of calibration data.

If the one or more HS codes are not known, then the computing device is configured to determine first data indicative of the Zeff of the segmented first regions of interest using the first plurality of calibration data. The second regions of interest, which include known HS codes, are used to provide additional data points to the recalibration model. As described earlier, the segmented first regions of interest are those corresponding to known materials while the segmented second regions of interest are those corresponding to one or more HS codes. Thus, if the one or more HS codes are known, then the computing device is configured to determine first data indicative of the Zeff of the segmented first region of interest and segmented second region of interest using the first plurality of calibration data.

At step 314, the computing device is configured to compare the first data with second data indicative of reference Zeff corresponding to the known materials and/or HS codes of the segmented first and/or second regions of interest. At step 316, the computing device is configured to determine if the first data is significantly different or deviated from the second data. In some embodiments, the first data is considered to be significantly different or deviated from the second data if the first and second data differ or deviate by at least 2 atomic number units. In some embodiments, the first data is considered to be significantly different or deviated from the second data if the first and second data differ or deviate by at least 3 atomic number units.

If a significant difference or deviation is determined, as defined above, then at step 318, the first plurality of calibration data is adjusted or modulated based on the second data in order to generate a second plurality of calibration data, the first plurality of calibration data is replaced by the second plurality of calibration data for storing in the memory, at step 320, and subsequently the flow moves to step 322.

It should be appreciated that the adjustment or modulation of the first plurality of calibration data is non-linear. The adjustment or modulation is dependent on the number of regions or sections of interest identified or available. In some embodiments, if the identified regions or sections of interest correspond only to container components then a shift in the calibration curves (of the first plurality of calibration data) is performed to recalibrate. However, if the regions or sections of interest with HS codes are also available then each calibration curve (in the first plurality of calibration data) corresponding to the specific type of material is modified or modulated.

At step 322, the computing device is configured to calculate a Zeff value for each individual pixel in the whole X-ray scan images. In embodiments, the Zeff value for each pixel is calculated using the second plurality of calibration data if the first and second data differ significantly, as defined above. However, the Zeff value for each pixel is calculated using the first plurality of calibration data if the first and second data do not differ significantly.

At step 324, the computing device is configured to apply materials segmentation algorithm to the X-ray images in order to generate a plurality of segments and thereafter apply a smoothing or averaging filter or algorithm to the Zeff values (of step 322) of multiple pixels, associated with each of the plurality of segments, in order to generate one or more smoothed Zeff-based segments, regions or clusters in the X-ray images. In various embodiments, the smoothing or averaging involves techniques such as, but not limited to, simple running averages to shape preserving smoothing filters, image-guided segmentation and K-means clustering.

Thereafter, at step 326, the computing device is configured to apply a predefined color map or code to the one or more smoothed Zeff-based regions of interest, segments or clusters. For example, a smoothed Zeff-based segment corresponding to organic materials are colored orange, metallic materials are colored in blue, inorganic materials are colored in green and high-Z materials are colored in red. Segments or regions with unreliable Zeff due to too little attenuation or too much noise remain uncolored (grayscale).

Finally, at step 328, the computing device is configured to render or display color-coded X-ray images on a display.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A method of performing an on-the-fly adjustment of calibration data corresponding to an X-ray inspection system that comprises an X-ray source in data communication with a computing device, the method being implemented in the computing device having one or more physical processors programmed with a plurality of program instructions that, when executed by the one or more physical processors, cause the computing device to perform the method, the method comprising:

generating, by the X-ray inspection system, a first plurality of calibration data, wherein the first plurality of calibration data is stored in a memory in data communication with the computing device;

generating, using the X-ray inspection system, data representative of X-ray scan image of a cargo container;

segmenting data representative of the X-ray scan image into a plurality of regions of interest, wherein at least some of the plurality of regions of interest contain only one type of material having at least one of a known effective atomic number (Zeff) or a known identification code;

determining, using the first plurality of calibration data, first data indicative of Zeff of the at least some of the plurality of regions of interest;

comparing the first data with second data indicative of Zeff corresponding to the known Zeff or known identification code;

adjusting the first plurality of calibration data to generate a second plurality of calibration data if the first data and the second data differ more than a predefined threshold; and using the second plurality of calibration data to process the data representative of the X-ray scan image to generate and display the processed X-ray scan image.

2. The method of claim 1, further comprising:
calculating a Zeff value for each pixel in the X-ray scan image;
applying a smoothing function to the Zeff values of multiple pixels, associated with each of the plurality of regions of interest, in order to generate smoothed Zeff-based regions of interest;
applying a predefined color map to the smoothed Zeff-based regions of interest to generate a color-cded X-ray scan image; and
displaying the color-coded X-ray scan image.

3. The method of claim 2, wherein the Zeff value for each pixel is calculated using the second plurality of calibration data if the first data and the second data differ more than the predefined threshold, and wherein the Zeff value for each pixel is calculated using the first plurality of calibration data if the first data and the second data do not differ more than the predefined threshold.

4. The method of claim 2, wherein the smoothing function comprises at least one a simple running average function, a shape preserving smoothing filter function, an image-guided segmentation function or K-means clustering function.

5. The method of claim 1, wherein the at least some of the plurality of regions of interest correspond to one or more empty regions of the cargo container or one or more unobstructed regions of the cargo container.

6. The method of claim 1, wherein at least one of the plurality of regions of interest corresponds to of a volume encompassing only a top surface of the cargo container, a volume encompassing only a front end of the cargo container.

7. The method of claim 1, wherein the first plurality of calibration data is generated by:
placing, between a radiation source and detectors of the X-ray inspection system, a set of materials with known atomic numbers and densities, wherein the set of materials have different thicknesses; and
recording responses of the detectors for each material of the set of materials.

8. The method of claim 7, wherein the X-ray scan image represents recorded data corresponding to both low and high energies of the radiation source.

9. The method of claim 1, wherein at least one of the plurality of regions of interest corresponds to a volume encompassing only a front end of the cargo container.

10. The method of claim 1, wherein at least one of the plurality of regions of interest corresponds to a volume encompassing only a rear end of the cargo container.

11. An X-ray inspection system comprising:
a radiation source;
an array of detectors;
a computing device in data communication with the radiation source and the array of detectors, wherein the computing device has one or more physical processors programmed with a plurality of program instructions that, when executed by the one or more physical processors, cause the computing device to:
generate a first plurality of calibration data, wherein the first plurality of calibration data are stored in a memory associated with the computing device;
generate, using data detected by the array of detectors, an X-ray scan image of a cargo container;
segment the X-ray scan image into a plurality of regions of interest, wherein at least some of the plurality of regions of interest contain a single type of a material associated with a known atomic number or a single type of a material associated with a known identification code;
determine, using the first plurality of calibration data, first data indicative of a first effective atomic number of the single type of the material associated with the known atomic number or a second effective atomic number of the single type of the material associated with the known identification code for at least some of the plurality of regions of interest;
compare the first data with second data indicative of a known effective atomic number corresponding to the material associated with the known atomic number or a known effective atomic number corresponding to the material associated with the known identification code;
adjust the first plurality of calibration data to generate a second plurality of calibration data if the first data and the second data differ more than a predefined amount; and
replace the first plurality of calibration data by the second plurality of calibration data in the memory.

12. The X-ray inspection system of claim 9, wherein the plurality of program instructions, when executed by the one or more physical processors, further cause the computing device to:
calculate an effective atomic number value for each pixel in the X-ray scan image;
apply a smoothing functionalgorithm to the effective atomic number values of multiple pixels, associated with each the at least some of the plurality of regions of interest, in order to generate smoothed effective atomic number-based regions of interest;
apply a predefined color map to the smoothed effective atomic number-based regions of interest to generate a color-coded X-ray scan image; and
display the color-coded X-ray scan image.

13. The X-ray inspection system of claim 12, wherein the effective atomic number value for each pixel is calculated using the second plurality of calibration data if the first data and the second data differ more than the predefined amount, and wherein the effective atomic number value for each pixel is calculated using the first plurality of calibration data if the first data and the second data do not differ more than the predefined amount.

14. The X-ray inspection system of claim 12, wherein the smoothing function includes at least one of a simple running averages, shape preserving smoothing filter function, an image-guided segmentation function or a K-means clustering function.

15. The X-ray inspection system of claim 11, wherein at least some of the plurality of regions of interest are empty or unobstructed.

16. The X-ray inspection system of claim 9, wherein at least one of the plurality of regions of interest corresponds to a volume encompassing only a top surface of the cargo container.

17. The X-ray inspection system of claim 9, wherein the first plurality of calibration data is generated by:
placing, between the radiation source and the array of detectors, set of materials with known atomic numbers and densities, wherein the set of materials have different thicknesses; and
recording a response of the array of detectors for each material in the set of materials.

18. The X-ray inspection system of claim 15, wherein the X-ray scan image comprises data representative low and high energies of the radiation source.

19. The X-ray inspection system of claim 11, wherein at least one of the plurality of regions of interest corresponds to a volume encompassing only a front end of the cargo container.

20. The X-ray inspection system of claim 11, wherein at least one of the plurality of regions of interest corresponds to a volume encompassing only a rear end of the cargo container.

* * * * *